Oct. 18, 1966          G. C. DEVOL          3,279,624

PROGRAMMED ARTICLE HANDLING

Filed Sept. 26, 1962          5 Sheets-Sheet 1

INVENTOR.
George C. Devol
BY
Paul S. Martin
ATTORNEY

INVENTOR.
George C. Devol
BY
Paul S Martin
ATTORNEY

INVENTOR.
George C. Devol
BY
Paul S. Martin
ATTORNEY

INVENTOR
GEORGE C. DEVOL

BY Paul S. Martin
ATTORNEY

United States Patent Office 3,279,624
Patented Oct. 18, 1966

3,279,624
PROGRAMMED ARTICLE HANDLING
George C. Devol, P.O. Box 1273, Greenwich, Conn.
Filed Sept. 26, 1962, Ser. No. 226,203
27 Claims. (Cl. 214—1)

The present invention relates to programmed apparatus and, more particularly, to programmed article handling and transferring apparatus.

In some aspects the present invention involves improvements over comparable apparatus in my Patent No. 2,988,237 issued June 13, 1961, and the present invention also involves certain novel concepts for achieving new results. To a large extent, that patent deals with article handling apparatus in which the programmed positions to which an article is to be moved are identified by combination codes having numerical values corresponding to locations along the path of motion of any given actuator. With such apparatus, each possible programmed position that the apparatus is capable of assuming is separated from the next-closest possible programmed position by a discrete incremental distance. A small incremental distance is desirable in order to enable the apparatus to move accurately to the desired programmed positions. If there were a large minimum increment of distance between each coded position and the next, within the capability of the apparatus, then the apparatus could only approximate the desired programmed positions. This may be considered as a digital system. Digital systems are characterized by relatively complex digital evaluation circuits and require relatively large capacity program controllers.

An object of the present invention resides in the provision of novel programmed apparatus in which the program is based upon the analogue concept. More specifically, it is an object of this invention to provide novel apparatus which utilizes a program controller having elements that are positioned corresponding to successive positions to be assumed by the controlled apparatus in one operating stroke after another.

The preferred embodiments of this aspect of the invention are detailed below, involving an article handling apparatus capable of operating an article gripper on an arm through various motions. Thus in the described apparatus the arm is capable of an in-and-out longitudinal motion, and is capable of sweeping through a horizontal angle, and is capable of swinging through a vertical arc, as examples of desired motions. Each motion is effected by an actuator that is controlled by an analogue program controller having a mechanical "memory" including one adjustable element for each of the successive programmed positions to be assumed by the apparatus.

An important object of the invention resides in the provision of programmed apparatus having a "teachable" analogue mechanical program controller, for establishing new programs quickly, easily and accurately.

A further important aspect of the invention resides in novel features of coordination between program-controlled actuators that effect successive motions of the apparatus and other devices such as an article gripper that is operated through programmed motions and still other apparatus that is associated with the article handling apparatus.

An additional feature of the invention relates to programmed apparatus using hydraulic actuators and, in this connection, a novel program controlled apparatus is provided that utilizes an inherent characteristic of an actuator causing deceleration as the program controlled position is reached. This is a significant consideration, in that it avoids the need for some form of programmed speed control means usually found in comparable automatic apparatus. Deceleration is needed to avoid completing the programmed stroke at full speed and then stopping suddenly with a jolt or overshooting the intended stopping point.

A still further object of the invention resides in speeding up the response of the apparatus to completion of each programmed motion, to minimize the time involved in actually starting the next motion of the program. As will be seen, one way of achieving this effect is to free the program control apparatus to advance to the next control position while the programmed apparatus is progressing toward the last position instruction.

Automatic apparatus that utilizes features of the invention is advantageously made portable or, in any event, it may be moved into association with other apparatus from time to time, and yet it may still be intended to repeat accurately its internally established program. An object of the present invention is to include novel provision for adjusting the programmed apparatus to its new association without depending upon the precise positioning of the apparatus itself and without disturbing the established program.

In one illustrative form of certain aspects of the invention detailed below, mechanical elements are provided in a "memory drum." In a preparatory operation, each element is shifted to any setting in a range, from one extreme setting to the other, in dependence on the control it is to effect. Its range of adjustment in inches may be numerically equal to the maximum range of operation in feet of the controlled actuator. Sometimes this operating range is substantially greater than that required in a given program of strokes. It is a feature of the invention that means is provided for retaining proportionality between the control-element displacements (from a reference datum) and the operating strokes of the actuator and nevertheless to change the proportionality constant. In that way, a recorded sequence of programmed motions which might be appropriate under one circumstance may be proportionally changed to meet modified conditions and yet the established program can be utilized. Otherwise the new conditions would inevitably require setting up a new program. In an example, an article transfer apparatus may be set up to pick up a series of articles spaced apart at different places on a pallet and to deposit them all at a common delivery point. Or the process might be reversed, starting at a common supply point and ending with a distributed pattern of article delivery points. Now then, if smaller articles distributed closer to each other are to be handled, it may be possible to utilize the same control program, merely by utilizing the proportionality control of the apparatus.

The nature of the invention, including the foregoing and other objects and novel features, will be more fully appreciated from the following detailed description of the illustrative embodiments of the invention shown in the accompanying drawings, these embodiments being presently preferred but being nevertheless given by way of example and illustrative of the novel concepts involved. In the drawings:

FIGURE 5 is an elevation of a modification of another portion of the apparatus in FIG. 2, and in particular FIG. 5 shows a modified form of program elements, setting means therefor, and means for coupling the program elements to the servo input control means;

FIGURE 5A is a fragmentary enlarged portion of a pin 56a and the end of adjustment shaft 190 in FIG. 5, this figure also representing the end adjustment shaft 195;

FIGURE 6 is the wiring diagram of a circuit for controlling each of the motors that forms part of the device in FIGS. 2 and 5, which adjust the setting of the program elements 56 and 56a;

FIGURE 7 is the wiring diagram of the control circuit for another motor in the modification of FIG. 5, namely, the motor 198 in the device that sets that pin 56a which is next to be advanced into position for sensing by interposer 66a;

in FIG. 2.

Figures 1, 1A, 2, 2A, 2B:
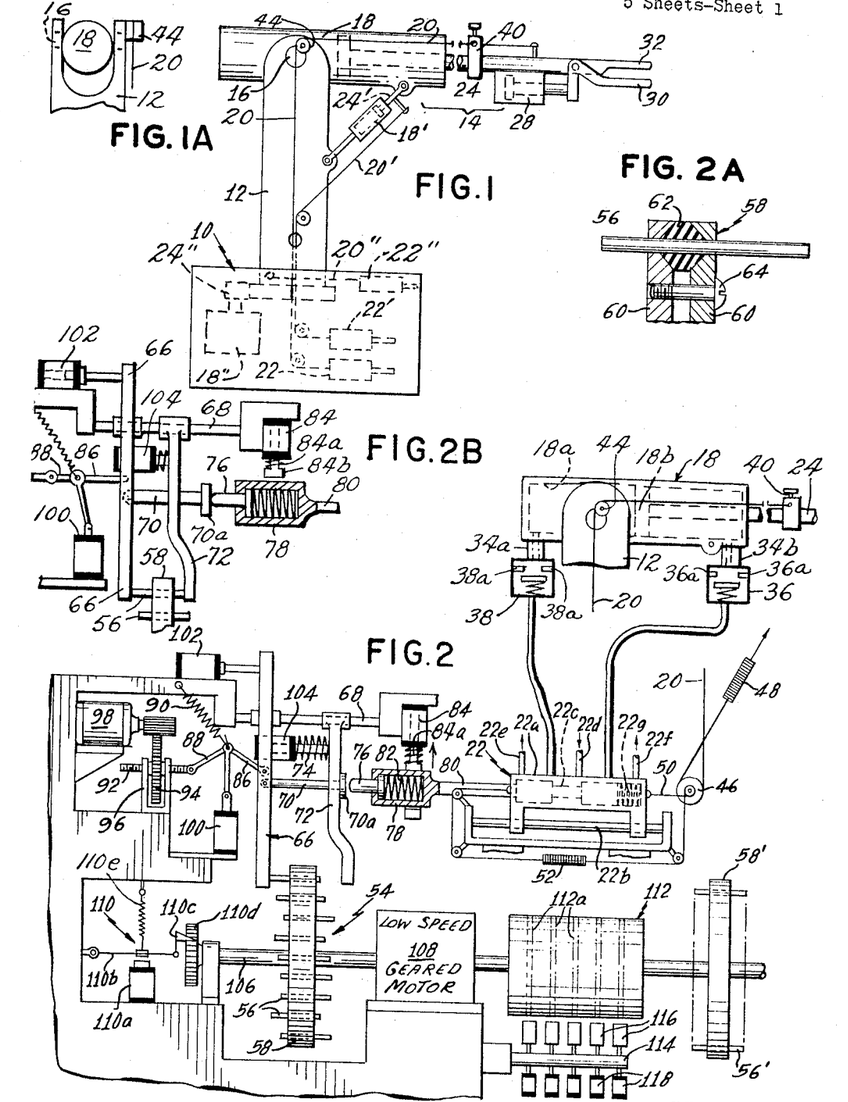
FIGURE 1 is a lateral view of an illustrative piece of apparatus employing the invention.
FIGURE 1A is a fragmentary view from the left showing the upper portion of the apparatus in FIG. 1.
FIGURE 2 is a somewhat diagrammatic lateral view of the program control mechanism for master valve 22 of FIG. 1 which is shown connected to hydraulic actuator 18 of FIG. 1, together with a program drum for controlling another motion of the apparatus of FIG. 1, and additionally including program means for coordinating auxiliary functions.
FIGURE 2A is an enlarged detail of a portion of program drum 58 in FIG. 2, FIG. 2A being a fragmentary cross-section at a vertical plane containing the axis of shaft 106.
FIGURE 2B is a fragmentary view of a portion of the apparatus in FIG. 2 in another position, namely, a position assumed by clamping jaws 66 and 72 in adjusting the setting of a program pin 56.

Referring now to FIG. 1, a machine base 10 is shown in which rotatably supported post 12 supports angularly movable arm 14. By means of a memory controlled servo system such as that in FIG. 2, post 12 may be rotated in any desired series of programmed motions. Such a servo system is represented in FIG. 1 by a rotary hydraulic motor 18″, mechanical feed-back connection 20″, and a master servo valve 22″ that controls motor 18″. (This hydraulic system is controlled in a manner substantially identical to that shown in FIG. 2 and described in detail below.) Arm 14 is pivoted to post 12 by a pivot 16, the upper end of this post being in the form of a yoke (see FIG. 1A) so that arm 14 can swing through the large vertical angle without obstruction. Relatively movable parts of hydraulic actuator 18′ interconnect post 12 and arm 14. A cable 20′ extends from the output end of hydraulic actuator 18′, and over suitable pulleys, to an internal master valve 22′ of the hydraulic servo system. (Hydraulic actuator 18′ and master valve 22′ are like hydraulic actuator 18 and master valve 22, which are described in detail below in connection with FIG. 2.) A shaft 24 extends from arm 14, and is operated by hydraulic actuator 18 in arm 14. Similarly, actuator 18′ has a mechanical-output shaft 24′ and motor 18″ has a gear coupling 24″ to post 12. A cable 20 extends from shaft 24 around a series of pulleys to a master control valve 22 of the servo system for operating arm 24. Cables 20 and 20′ are appropriately supported on pulleys so as to remain substantially aligned with the axis of post 12 at the base of that post, where those cables extend to master control valves 22 and 22′ in base 10. A solenoid-controlled hydraulic actuator 28 is carried by shaft 24, for operating jaw 30 connected by a pivot to shaft 24. An article may be sized between operated jaw 30 and fixed companion jaw 32 on shaft 24.

Such a piece of apparatus can be utilized to perform innumerable functions when properly programmed, and as will be seen below, the apparatus is equipped with readily teachable program control means. The three proportional motions described (about post 12, about pivot 16 and along shaft 24) are purely illustrative of the various motions that may be desired in such apparatus. The apparatus performs as a programmed robot in carrying out a complex sequence of coordinated motions. Thereafter a new sequence of motions can be taught to the program controller.

Programmed servo controlled motions may be taught and executed by means of control apparatus such as that shown in FIG. 2. This apparatus includes hydraulic actuator 18 including a cylinder 18a and a piston 18b from which the usual guided shaft 24 projects. In the form illustrated, cylinder 18a is relatively stationary, and mechanical work is obtained from shaft 24. Piston 18b and shaft 24 are moved to the right and the left by means of hydraulic fluid admitted under pressure to the respective ends of cylinder 18a, in usual fashion, this fluid being supplied by hydraulic lines 34a and 34b. The master valve 22 for controlling the operation of actuator 18 includes a body 22a that is slidably mounted on a fixed guide rail 22b, which may be square in cross-section. Valve 22 includes a so-called spool 22c that is appropriately shaped to deliver hydraulic pressure to either one of the hydraulic actuator lines 34a and 34b, or to shut off the fluid supply to both of those lines when the hydraulic actuator is to remain stationary. Lines 34a and 34b are flexible where they are connected to reciprocating body 22a of the control valve. Hydraulic fluid under pressure is supplied to valve 22 from the high pressure end of a supply of pressurized hydraulic fluid (not shown) by a supply line 22d. Hydraulic fluid from the low-pressure side of actuator piston 18b is returned by the corresponding line 34a or 34b to valve 22, and this fluid is returned to the hydraulic system by lines 22e and 22f. The arrows in the drawing represent the supply and discharge directions of flow of the fluid. Appropriate hydraulic servo valves and systems for this apparatus are commonly available, and are disclosed, for example, in Section 15 of "Control Engineers' Handbook," first edition, edited by John G. Truxall and published 1958 by McGraw-Hill Book Company. Also, while a simple master servo valve is shown, diagrammatically, it will be understood that more elaborate hydraulic servo controls may be substituted.

Lines 34a and 34b contain pressure switches 36 and 38 shown diagrammatically, including a pair of contacts 36a and 38a that are normally spring biased closed. When fluid under pressure is being delivered via either line 34a or 34b, one pressure switch 36 or the other 38 will be open.

Figure 10:
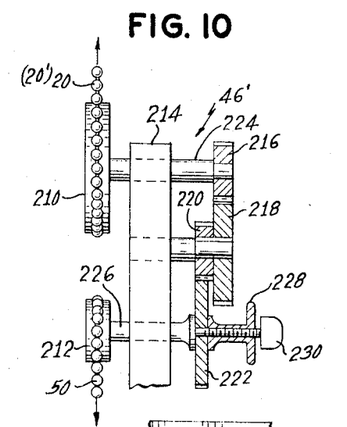
FIGURE 10 is an elevation, partly in cross-section, of the servo-ratio pulley 46 shown diagrammatically in FIG. 2.

There is a feed-back connection between the master or control valve 22 and the actuator 18, so as to constitute a servo system. This feedback system includes a clamp 40 that is adjustable along shaft 24 and may be fixed in place at the desired location. A cable 20 extends around pulley 44 and around the large diameter portion of servo ratio pulley 46 and then to a tension spring 48. Another cable 50 extends from valve body 22, around a small diameter portion of pulley 46, and around other pulleys to the opposite end of valve body 22, and it is maintained taut by tension spring 52. The travel of cable 20 may be arranged to have any desired ratio to the much smaller travel of cable 50 by suitable choice of the large diameter and small diameter portions of pulley 46. Other well-known forms of drive may be used to adjust this ratio. One form of the latter is shown in FIG. 10 and is described in detail below. Because of the ratio of the large diameter and small diameter portions of pulley 46, body 22a of the master valve need move through only a short stroke in achieving a long stroke mechanical output of the hydraulic actuator 18. The hydraulic servo involving valve 22 and actuator 18 with the feedback coupling system, as described, can be controlled for operation through any portion of its operating range by mechanical input to spool 22a. The starting position of the mechanical output element is controlled by adjustment of the feedback coupling clamp 40 along shaft 24. The small diameter portion of pulley 46 is also made readily adjustable in relation to the large diameter portion, in the manner shown for elements 212 and 222 in FIG. 10, as an alternative starting point adjustment. The ratio of mechanical output to control input can be adjusted, as already described, by selecting the proper portions of pulley 46 for the cables. Cables 20 and 50 are shown wrapped around nearly 360 degrees of the pulley; and if this does not provide sufficiently positive coupling between the two (complete avoidance of slip and creep is desirable), the cables can be appropriately formed as with bumps, teeth or links (as shown in FIG. 10 for example) for mesh with a correspondingly formed pulley.

For the purpose of providing mechanical control input to the hydraulic servo, the apparatus of FIG. 2 includes program control apparatus. This includes a program member 54 in the form of a disc or drum which contains a circular series of program elements or control pins 56. These pins are adjustable axially relative to the drum 58, but they are normally held tightly in place. As seen in FIG. 2A, one form of drum 58 includes a pair of metal plates 60 having confronting grooves containing an annulus 62 of synthetic rubber or like material. Pins 56 pass through aligned holes in plates 60 and annulus 62. Screws 64 adjacent annulus 62 tighten the two plates 60 toward each other and in this way compress annulus 62 against pins 56 to provide firm gripping friction of the pins 56 by annulus 62. This arrangement for holding the pins firmly in any position is illustrative. The grip is to be sufficiently reliable to prevent pins 56 from slipping lengthwise relative to drum 58 during programmed operation of the apparatus and, at the same time, the friction should not be so extreme as to interfere with adjustment of each pin when the program is initially being set, as described in detail below. It is contemplated that a screwdriver or the like may be used to relax the frictional engagement of each pin 56 when the program is being established initially, and thereafter a tighter grip of the pins can be restored in like manner.

A sensing interposer 66 is slidably mounted on a wide, flat guide rail 68 for horizontal reciprocation. Interposer 66 includes a rod 70 which extends through a clamping jaw 72. (As discussed in detail below, there is one phase of operation of the apparatus wherein jaw 72 is biased against the right-hand end of a pin 56, shown in FIG. 23, and at such times the pin 56 is gripped between jaw 72 and interposer 66, the latter acting as a companion jaw.) Compression spring 74 biases jaw 72 away from interposer 66 during program-controlled operation of the machine. The separation of jaw 72 from interposer 66 is limited by head 70a on rod 70, this separation being made sufficient to clear all pins 56 on drum 58 in their extreme opposite adjustments as the drum is indexed to advance the pins successively between the jaws. Input tip 76 is telescopically received in a tube 78 carried by shaft 80 which extends from master valve spool 22c. A spring 22g within the valve normally moves spindle 22c to the left. Another spring 82 within tube 78 normally biases sensing tip 76 to the extended position illustrated, limited by abutting portions of the tube 78 and the sensing tip 76 as shown.

An electromagnetic brake 84 is shown, having a movable portion 84b biased by compression spring 84a into firm engagement with the external extension of valve spool 22c. This extension includes tube 78 and shaft 80, to hold the valve spool in a fixed position when the brake is deenergized. When the brake 84 is energized, brake portion 84b is retracted and the brake is released.

Toggle links 86 and 88 are connected to each other, and a tension spring 90 is connected to the knee of this toggle. The end of link 86 remote from the toggle knee is connected to sensing interposer 66. The remote end of toggle link 88 is pivoted to a threaded rod 92 extending through a threaded passage in gear 94. Bearings 96 support gear 94 and prevent its movement axially. A "teach" motor 98 has its output shaft in the form of a pinion that is meshed with gear 94. An electromagnet 100 is coupled to the knee of toggle links 86 and 88 and, when energized, electromagnet 100 is effective to erect or straighten toggle links 86 and 88.

Spring 90 is directed so as to buckle toggle 86, 88 and additionally to bias a sensing interposer 66 to the left, that is, out of contact with the opposed pin 56. Sensing electromagnet 102 applies thrust to sensing interposer 66, sufficient to bias the interposer into sensing contact with one of the pins 56 that is in sensing position and, when brake 84 is released, to move the assembly 76, 78, 80 and 22c to the right and thereby to compress spring 22g. In such an operation, the telescoped parts 76 and 78 remain fully extended by virtue of the precompression of spring 82.

At certain parts of the operating sequence, electromagnet 102 may be energized while brake 84 grips shaft 80. Depending upon the position of the pin 56 that is to be sensed by interposer 66, it is also desirable that the electromagnet 102 should have sufficient force to compress spring 82. In the extreme condition, electromagnet 102 may move interposer 66 to the right against a pin 56 in its extreme right setting while shaft 80 is locked in its extreme left position. Telescopic members 76 and 78 accommodate this motion, and electromagnet 102 compresses spring 82 accordingly. Thereafter, when brake 84 is released, spring 82 fully extends telescopic elements 76 and 78 while input tip 76 of the servo valve remains in contact with rod 70 of interposer 66. In so doing, spring 82 becomes fully extended to its prebiased condition (the configuration shown) and spring 22g biases tip 76 against rod end 70a. It will be understood, however, that pins 56 are held securely in place against displacement by electromagnet 102. The force of this electromagnet is insufficient to shift any pin 56 axially relative to its support 58.

Clamp actuating device 104, being either an electromagnet or a solenoid controlled hydraulic actuator, has one portion secured to interposer 66 and a portion secured to jaw 72. When being operated, device 104 is effective to cause a pin 56 to be clamped endwise between jaw 72 and interposer 66. Otherwise spring 74 keeps jaw 72 extended and clear of all pins 56 which advance into the space between the jaws when drum 58 operates. During the advance of drum 58, sensing interposer 66 is retracted by spring 90. Electromagnet 102 is not energized at this time, as is more fully discussed below in connection with FIG. 3.

Program member 58 is a drum in the form shown, but could take other forms. In the form shown, drum 58 is fixed to shaft 106 carried in suitable bearings, including the bearings of a motor 108 having built in speed reduction gearing. Shaft 106 is advanced stepwise by a suitable indexing mechanism 110. For example this includes an electromagnet 110a, its pivoted armature 110b, a pawl 110c biased upward by spring 110e, and ratchet 110d that is fixed to shaft 106.

Shaft 106 also carries a master program storage member 112 which, here, is a magnetic drum having five control tracks 112a extending in a circle about the drum. A shaft 114 supports a row of sensing heads 116, each being positioned to sense a respective spot or area of each circular track and to provide different output depending upon the magnetic state of the area on drum 112 that is in sensing position. Those areas or spots positioned opposite heads 116 at any one time form a control "slot." Sensing head 116, in this embodiment, is of a well-known type that is capable of sensing a magnetic spot when there is no relative motion between the drum 112 and the sensing head 116, such heads conveniently being termed "at-rest" sensing heads. For example, such head may be of a form shown in my patent mentioned above. For simplicity, it may be assumed that the control tracks 112a on drum 112 are either magnetized or not magnetized to distinguish "on" and "off" instructions. When there is a magnetic spot under this assumption, it will be understood that magnetic sensing head 116 provides an output and does not provide an output when the area of the drum 112 that is opposite the sensing head is not magnetized. Another series of heads 118 are supported on shaft 114 diametrically opposite sensing heads 116. Heads 118 are electromagnets which, when disposed opposite drum 112 by properly indexing shaft 114, are energized by suitable means to erase previous spots and then, selectively, to record spots in the areas where on spots may be desired.

The operation of the apparatus thus far described may be reviewed at this point. (Control and operation of the electromagnets, motors, etc. in FIG. 2 are explained below in connection with FIG. 3).

It may be assumed that pins 56 have been set in accordance with the desired sequence of motions of shaft 24 (FIG. 2) at the mechanical output end of the hydraulic servo apparatus. It may also be assumed that shaft 80 is set in a position corresponding to a sensed pin 56 and that brake 84 grips shaft 80. Under these conditions, hydraulic fluid is delivered by one hydraulic line 34a or 34b to hydraulic actuator 18. This flow continues until mechanical output shaft 24 reaches the position required by the programmed pin setting. This is achieved when valve body 22a has been shifted by the servo feedback coupling including cable 20 and cable 50 to the place where hydraulic fluid is no longer delivered to the hydraulic actuator, that is, until valve body 22a has shifted to the off or balanced position relative to the spindle 22c of the valve. Where the servo system utilized is a hydraulic type of servo as shown, then the approach of the mechanical output member 24 to its required end position is reached in a fast motion that is decelerated automatically as the valve approaches its off or balanced condition. This deceleration is highly desirable and is here achieved without resort to additional complicating control apparatus.

It was assumed that shaft 80 is locked by brake 84 while the hydraulic servo system seeks the destination dictated by the position of shaft 80. During the time that the hydraulic sysem is in such operation, the program control apparatus is also in operation to present the next destination instruction to sensing tip 76 of the servo control valve. During the entire programmed operation, solenoid 100 and device 104 remain deenergized. Electromagnet 102 is not energized when the program-control apparatus is being advanced. Spring 90 acts through link 86 to shift sensing interposer 66 to the left, spaced from the extreme left-hand end position of pins 56. Stepping mechanism 110 advances program member 58 to position the next pin 56 opposite sensing interposer 66. Electromagnet 102 is then energized and interposer 66 is pushed against the pin 56 that has just been advanced into sensing position opposite interposer 66. The same operation drives rod 70 to the right. At this time, brake 84 grips and arrests shaft 80 in its previous programmed position. If there is clearance between head 70a and sensing tip 76 of the hydraulic servo system, (the condition illusarted in FIG. 2) then nothing more happens at this time. Head 70a waits until the brake is released and then spring 22g pushes the assembly 22c, 80, 78, 76 to the left until tip 76 engages rod head 70a. On the other hand, when electromagnet 102 pushes interposer 66 against pin 56, sensing tip 76 may be in a position too far to the left to allow free travel of rod 70. In that event, rod 70 drives sensing tip 76 to the right and compresses spring 82.

When actuator 18 has completed the stroke required by the locked position of shaft 80, the pressure switches 36 and 38 both are closed. This initiates a new cycle of operation. If the next step in the cycle dictated by program drum 112 is to direct the hydraulic system to its next position, then brake 84 is released under control of apparatus detailed below. Spring 82 or spring 22g (as the case may be) drives shaft 80 to assume its next control position with sensing tip 76 in contact with head 70a of rod 70, and the above sequence of operations is repeated. Hydraulic actuator 18 starts promptly to operate toward the new position. Brake 84 locks shaft 80 in its new position. Electromagnet 102 is deenergized and allows spring 90 to retract sensing interposer 66. Program member 58 advances to carry the next pin 56 into the sensing position, and electromagnet 102 is again energized to drive interposer 66 against the newly positioned program pin.

The foregoing program controlled servo system is effective to operate the mechanical output element 24 into a series of analog positions which correspond to the actual settings of pins 56 in program member 58. The absolute position of the actuator is fixed by the adjustment of clamp 40 along shaft 24 and by the ratio of the two diameters of pulley 46 that are selected for cables 20 and 50. The adjustment of clamp 40 makes it possible for a prerecorded program to be carried out by the apparatus when that apparatus is bodily relocated next to a new work assignment. The adjustable ratio unit 46 makes the pattern of motions adjustable, in the manner of a pantograph, so that any ratio can be established between the settings of pins 56 and the mechanical output stroke of element 24. These features are more fully discussed below, in connection with FIG. 10.

While the mechanical servo is proceeding to each destination dictated by a given control element or pin 56 in the program, the program mechanism is, itself, advancing to place the next pin of the program in effective position. Because of this relationship of the hydraulic servo and the program mechanism that involves the sensing interposer, there is a minimum of time required after the completion of each dictated mechanical stroke until the next mechanical stroke can commence. Except where the operationial program of drum 112 so dictates, there will be little or no delay between each stroke of the hydraulic actuator and the next dictated by the program of drum 58.

The program drum 58, the sensing interposer 66 and its related mechanism, and the hydraulic servo mechanism are all effective to produce one of the motions of the apparatus in FIG. 1. Thus, the described apparatus is effective to operate shaft 24 lengthwise, carrying jaws 30 and 32 right and left in FIG. 1. Duplicate means (not shown) is effective to control the swing of arm 14 through a vertical arc by controlling hydraulic actuator 18'. Other coordinated motions take place concurrently. These are carried out by duplicate control apparatus, using additional program members that are on shaft 106 or geared to it. One such program member 58' is illustrated in FIG. 2. The same magnetic program apparatus 112, 116 serves for all of the motions carried out under control of drums 58, 58', etc.

An important feature of the present invention involves the capacity of the apparatus to be taught a new sequence of motions readily. This is done as follows:

It may be assumed that a new program is to be started. Recording heads 118 are indexed so as to be opposite a slot of magnetic drum 112. Solenoid 102 is deenergized, and teach solenoid 100 is energized. This results in toggle 86, 88 becoming erect or straight. The position of interposer 66 is then positively determined by the position of threaded rod 92. Device 104 is energized to drive clamping jaw 72 against the opposite end of one pin 56 that is interposed between the jaw 72 and a portion of interposer 66 that acts as the companion clamping jaw (FIG. 2B). The forces of actuating devices 100 and 104 are sufficient to overcome the frictional grip that holds the interposed pin 56 in any given setting. Pin 56 accordingly assumes a new setting dictated by the adjustment of threaded rod 92.

The hydraulic servo system assumes the position dictated by interposer 66, and the servo-system position corresponds to the enforced position of pin 56. Motor 98 is operated to adjust the setting of threaded rod 92; and the hydraulic system and the setting of interposed pin 56 follows continuously. As soon as a given mechanical output position of the hydraulic actuator 24 is attained, motor 98 is turned off and the setting of the clamped pin 56 is complete. Actuators 100 and 104 are deenergized so that jaw 72 and sensing interponent 66 are withdrawn from the possible path of the ends of the next pin 56 that is to advance between the jaws; and indexing mechanism 110 is operated to position the next pin 56 between interponent 66 and jaw 72. Brake 84 is operated to clamp rod 80 just before actuators 100 and 104 are operated, so that the hydraulic servo system holds the mechanical-output element 24 and like elements in the other motions of the whole apparatus in their last settings. Program member 58 is advanced one step by indexing mechanism 110. The new pin 56 between interponent 66 and jaw 72 will normally have a setting different from that of the pin that was just set. This makes no difference. Operation of actuators 100 and 104 drives the new pin 56 to assume the same position as the previously set pin. Brake 84 is then released. Motor 98 is manually controlled so that this newly advanced pin 56 is adjusted to a position corresponding to the next destination required of mechanical output element 24. In this way, by operating the control pins of the memory and concurrently causing coordinate mechanical operation of the system, a new program can be quickly recorded with complete confidence that the apparatus will repeat the recorded program after the "teaching" process has been completed.

The operation just described for adjusting pins 56 of drum 58 is representative of the operations that are performed for all the other program members 58', etc., and their pins. The settings of all the pins 56 of drums 58, 58', etc., are adjusted at each step of the teaching process, before indexing shaft 106 to the next position. Each time the shaft is indexed to advance another complement of pins 56, 56', etc. into alignment with their respective clamping jaws, another slot is presented to heads 118. All of these heads are first energized with an alternating current erase signal, and then selected heads 118 are energized with direct current to record function control spots. The signal sources and control switches to effect the described erase and record operation are well known, and their description is therefore omitted. These spots will effect various functions that are to take place as soon as the hydraulic actuators 18, 18', etc. reach the various positions corresponding to the complement of pins 56, 56' etc. that were set in the immediately preceding pin-setting operation. These operations are more fully discussed below in connection with the discussion of FIG. 3. The pins 56, 56', etc. that are in position to be clamped by companion jaws 66 and 72, etc., are set to positions corresponding to the next positions that actuators output elements 24, 24' and 24", etc. are to assume immediately after the function or functions have been carried out according to the control recordings of the particular slot as just described.

Figure 3:
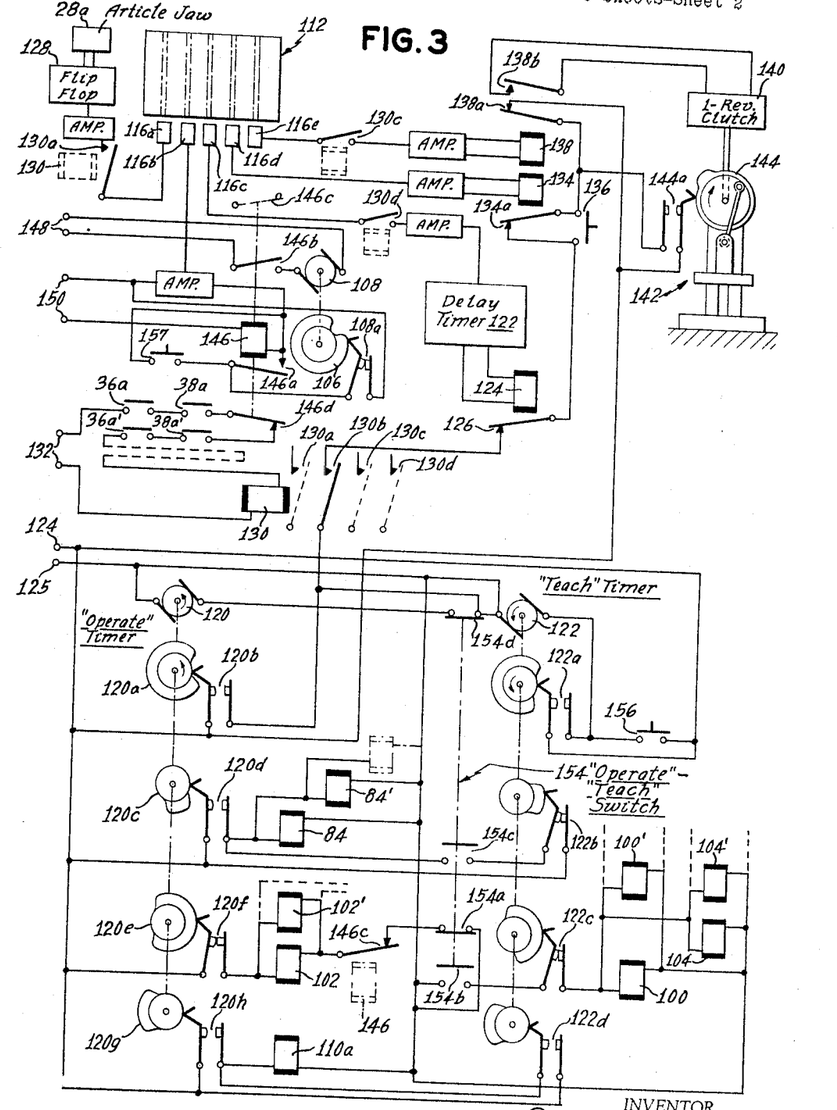
FIGURE 3 is a wiring diagram of the control circuit for the apparatus in FIG. 2, together with additional diagrammatically represented apparatus coordinated with the apparatus of FIGS. 1 and 2.

The wiring diagram of the various actuators and motors in FIG. 2 is shown in FIG. 3, where in additional coordinating and coordinated devices are included. In FIG. 3, there are two timing motors 120 and 122, being parts of an operate timer and a teach timer, respectively. These timing motors are energized by a power source connected at input terminals 124 and 125, under control of respective circuits.

The control circuit of operate timing motor 120 includes pressure contacts 36a and 38a, in a control more fully described below. Motor 120 operates cams 120a, 120c, 120e and 120g which operate respective cam contacts 120b, 120d, 120f and 120h. Momentarily after motor 120 starts to operate, cam 120a closes cam contacts 120b to complete a holding circuit so that motor 120 will complete its cycle after it has once been started by its control circuit. Cam contacts 120d are connected in series with servo lock or brake solenoid 84 and the servo lock or brake solenoids 84' etc. of other hydraulic servo 18', etc. As mentioned above, servo control locking device 84 or brake is normally spring-biased to lock shaft 80, and is energized momentarily to release or unlock shaft 80. Cam 120c is rotated counter clockwise, as are the other cams of operate timing motor 120. The servo locks or brakes are released only momentarily, and this occurs at the beginning of the operate timer cycle but after the timer hold contacts 120b close. For this reason, the timer operation is sustained despite the opening of any pressure switch 36a, 38a, etc.

Cam 120e and cam contacts 120f energize sensing solenoid 102 so as to maintain interposer 66 biased against the effective pin 56 during the time that the servo control lock 84 is released. In this way, immediately after contacts 36a and 38a, etc. close, signaling the completion of one servo controlled stroke, shaft 80 of the servo control valve is released and is shifted by springs 22g and 82 into position for starting the succeeding mechanical stroke. It will be noted that interposer 66 was in readiness to effect immediate positioning of shaft 80. A further cam 120g and cam contacts 120h operated thereby are effective to energize actuator 110a for indexing program shaft 106. This occurs only during a part of the cycle when cam contacts 120f are open, so that interposer 66 is withdrawn from all possibility of being in the path of any pin 56 on the program drum. When the indexing operation has been completed, contacts 120f close once again and electromagnet 102 once again biases interposer 66 against the newly advanced pin 56.

The foregoing represents the normal timer controlled sequence of operations of the program drum, the sensing interposer 66, and brake 84 and the remainder of the hydraulic servo actuator 18. It is understood that the other analogue controlled motions of the hydraulic servo systems are controlled concurrently and in the same manner.

Timer motor 120 has a control circuit that includes pressure switches 136a and 138a in series, and these are in series with like pressure switches 136a' and 138a' of another hydraulic actuator; and further pressure-switches are included as required by the hydraulic actuators utilized.. All these pressure switches are in series with the winding of relay 130, in a circuit connected to supply terminals 132. Relay 130 is energized only when all the pressure switches are closed. Thus, the completion of the respective program controlled strokes of all the servo actuators in the apparatus is symbolized by energization of relay 130. Relay contacts 130b are in series with operate timing motor 120, and if other contacts in series with contacts 130b are closed, the operate timing motor will start its cycle. Such other contacts are described below, and are for delaying further programmed servo strokes until programmed functions have taken place. Progressing from one programmed set of servo actuator strokes to another is thus dependent jointly on completion of the coordinated servo actuator strokes and on completion of the programmed functions.

The programmed concurrent set of servo actuator strokes can follow one after another, or such operations can be modified in a number of different ways to enable the automatically controlled article handling apparatus of FIGS. 1 and 2 to cooperate with other apparatus and to effect other operations. Such other operations are carried out under control of drum 112 and sensing heads 116a, b, c, d and e. In its output, each of these sensing heads includes appropriate circuits, as an amplifier, a rectifier, etc.

Sensing head 116a provides a sequence of signals to a bistable flip-flop 128 that alternately energizes and deenergizes an electromagnetic valve 28a that controls actuator 28 of the article gripper. These signals are supplied via contacts 130a of relay 130. So long as hydraulic actuator 18 (FIG. 2) is in operation, there is high pressure in one of its lines 34a or 34b. When actuator 18 reaches its destination as dictated by the set and locked position of its servo input shaft 80, the pressures in both hydraulic lines 34a and 34b drop and both pressure switches 36a and 38a are closed. Correspondingly, the pressure switches 36a' and 38a' of another hydraulic actuator 18' will close when that actuator reaches its required position, and so on for pressure switches of the other program controlled servo hydraulic actuators of the apparatus. When all of the actuators 18, 18', etc. have come to rest, all the pressure switches close and relay 130 is energized. Contacts 130a are closed, and then the sustained signal from at-rest sensing head 116a is transmitted to flip-flop 128. Presuming flip-flop 128 was previously in its "jaws-open" condition, then this signal causes the flip-flop to reverse into its "jaws-closed" condition. The jaws remain closed until another signal is subsequently supplied to flip-flop 128 from pickup head 116a.

Sensing head 116c provides a control signal via relay contacts 130d to start a delay timer 122 for energizing relay 124 and opening contacts 126 for a short time interval. Any suitable monostable circuit or mechanical delay device may be used. Contacts 126 are in series with relay contacts 130b connected to timing motor 120. So long as the delay timer keeps contacts 126 open, the operate timer will remain idle and hydraulic servos 18, 18' etc. will remain in their programmed positions. Such a delay may be desired for many reasons. For example, it may be desired to use the mechanical output apparatus to immerse a hot forging in a quenching liquid at the end of one stroke, and then a dwell is desired before starting the next program controlled stroke. Another application of such delay is to allow time for article gripping jaws 30 and 32 to operate under control of its actuator 28 before starting the next stroke. A number of additional delay timers with different sensing heads may be utilized for providing other delay times, as may become desirable.

Pickup head 116d operates a relay 134 for opening contacts 134a in series with relay contacts 126 and 130b and operate timer 120. So long as drum 112 remains in a position in which pickup head 116d continues to deliver an output signal representing a control recording, relay 134 remains energized. During this same time, contacts 134a remain open. Contacts 134a are in series with relay contacts 130b, and the circuit to operate timer 120 is broken. This produces an indefinitely prolonged interruption in the programmed sequence. Such an indefinitely long delay may be necessary in order to allow time for an attendant to carry out a necessary function supplemental to the operation of the automatic apparatus. A switch 136 that by-passes contacts 134a is provided, to be closed manually by the attendant when that operation has been completed.

Pickup head 116e provides a signal to relay 138 via relay contacts 130c. Relay 138 has a pair of normally-closed contacts 138a in series with relay contacts 126, 130b and 134a. After relay 130 is energized, normally closed contacts 138a open, if head 116e produces an output signal. Relay 138 has an additional pair of contacts 138b which are normally open but which close in response to output from head 116e to energize a one-revolution clutch 140 that drives a coordinated machine 142 such as a press 142 through one cycle of operation. The coordinated machine may operate upon an article that is held in jaws 30, 32. The article is thereafter removed, but only when the work of the coordinated machine is done. Cam 144 that is coupled to or is part of the one-cycle drive of press 142 closes contacts 144a near the end of the machine cycle. Cam 144 momentarily closes a pair of contacts 144a which are in parallel with contacts 138a. When this occurs, operate timer 120 is initiated into operation. Contacts 144a are open between operating cycles of cam 144.

The start of the cycle of operation of outside controlled machine 142 is delayed until completion of all the programmed strokes of the various actuators 18, 18', etc. For this purpose, relay 130 has a pair of contacts 130c between pickup head 116e and relay 138. Contacts 130c close only after pressure switches 36a, 38a, etc., are all closed.

It will be apparent from the foregoing description that the conclusion of each set of operations dictated by drum 112 must take place before operate timer 120 can proceed. Relay contacts 130b are in series with contacts 126, 134a and 138a of the coordinated-function relays for this purpose. However, if there are no supplementary functions to be accomplished in any given position of drum 112, then none of the pickup heads 116a, 116c, 116d or 116e will produce an output signal. In that event, completion of one set of operating strokes of the programmed servo actuators 18, 18', etc. will be immediately effective to initiate operation of operate timer 120. This causes prompt release of each servo control lock or brake 84 on shaft 80, thereby establishing a new position for each shaft 80 in accordance with its sensing interposer 66 and this promptly initiates the next-following programmed strokes of the servo actuators. At the instant that servo-control locks 84, 84', etc. are released by closing of cam contacts 120d, shafts 80 assume their next programmed positions, and all the hydraulic servo actuators 18, 18', etc. start their next strokes of operation. Operate timer 120 continues to advance and as it does, brakes 84, 84', etc. lock shafts 80 in their new positions. The actuating electromagnets 102 are then deenergized so that each spring 90 retracts its sensing interposer 66 of each of the analog control units of the apparatus for causing the drum advance electromagnet 110 to operate. This advances the next slot of drum 112 into control position opposite the pickup heads 116a, b, c, d and e; and it also advances the next set of pins 56 (one on each drum 58, 58', etc.) into position opposite their respective sensing interposers 66. Before the end of the operate timer cycle has occurred, electromagnets 102, 102', etc. are reenergized for causing the respective sensing interposers 66 to cooperate with the newly positioned set of pins 56. At this time, however, the servo control shafts 80 all remain locked in their previously set positions and continue to carry out the instructions to proceed to the previously dictated analog positions. Upon completion of these operating strokes, the pressure switches previously described are all closed, and the ensuing functions take place as already described.

The apparatus proceeds step-by-step through its program as dictated by drum 112 and by the various control-pin drums 58, 58', etc. until the desired sequence of functions and motions has been completed. This will ordinarily occur before the end of the total capacity of the program storage has been utilized. For example, a given program may involve only 54 of the total number of 72 control positions (e.g.) of shaft 106. Nevertheless, it is usually desirable for the cycle to be automatically resumed. For this purpose the following additional control apparatus is provided. Pickup head 116b is connected through an amplifier to a relay 146 having "stick" contacts 146a in series with cam contacts 108a operated by program reset motor 108 (FIGS. 2 and 3). Contacts 108a are closed in all positions of the program shaft 106 except for the initial position of the program. Relay contacts 146b are in series with motor 108, and connect power to this motor from terminals 148.

It may be assumed that a magnetized spot has been detected by pickup head 116b, and this provides a steady-state output so long as the drum 112 remains in position with its end-of-the-cycle magnetized spot opposite head 116b. This connects power from terminals 150 to relay 146 through amplifier 152; and as soon as the relay has been energized, it establishes its own hold circuit through stick contacts 146a and cam contacts 108a, directly from power-supply terminals 150. At the same time, contacts 146b close and energize the motor which then rotates and (through appropriate reduction gearing) drives shaft 106 toward the start position of the program. When this is reached, contacts 108a open and relay 146 is denergized so as to open its contacts 146a and 146b, stopping motor 108 and shaft 106 at start.

During the time that the program reset motor is being operated to return the program drum assembly to its start position, two other precautions should be taken. Sensing interposer 66 should be retracted; and for this purpose, relay contacts 146c are provided, in a series with solenoids 102, 102', etc. As soon as relay 146 is energized, the contacts 146c will open to deenergize electromagnets 102 and cause sensing interposers 66 to be retracted out of the paths of advancing pins 56, 56', etc.

Relay 146 has an additional pair of contacts 146d in series with all the pressure switch contacts 36a and 38a, 36a' and 38a', etc. Relay contacts 146d are normally closed so that relay 130 will normally be energized when all of the pressure switch contacts close. Relay 130, it will be recalled, is normally effective when energized to initiate a cycle of operation of the operate timer when the pressure-switch contacts close. This is to be avoided during return of the program apparatus to its start position, so that brakes 84, 84', etc will remain locked during program reset. Relay contacts 146d disable relay 130 and the operate timer during program reset.

When cam contcats 108a open and the program apparatus is at its satrt position, contacts 146c reclose. Sense electromagnets 102, 102', etc. are energized and operate the various sensing interposers 66 into cooperation with their respective program pins 56, 56', etc. Contacts 146d also close, thus energizing relay 130 and starting operate timer 120. Thereafter, when cam contacts 120d close, the servo control locking devices are unlocked by electromagnets 84, 84', etc. In this way, a new programmed cycle of operations is started automatically.

In the apparatus thus far described, the automatic apparatus in FIG. 1 can be caused to operate through a sequence of analog controlled motions under control of previously adjusted pins 56, 56', etc. and such complex motions of the apparatus in FIG. 1 may be coordinated with the operations of the article jaw 30, 32, with auxiliary apparatus such as press 142, and in like manner with various other operations. In an example, jaws 30, 32 may be transported so as to grip a casting in a die casting machine, lift the casting out of the machine, dip the casting into a tank of quenching liquid, transport the casting into a trimming press or a drill press or a riveting machine; and thereafter the article may be transported through cleaning and painting stations and finally delivered to a finished part conveyor or bin.

From time to time, the program stored in the control apparatus may be changed to teach the article handling apparatus new duties. Means is provided in the apparatus for quickly and directly performing such duties under manual control, and at the same time recording the sequence of steps in the program control portion of the apparatus.

In FIG. 3, an operate-teach switch 154 is provided, that is normally in the operate position. In that position switch 154 has normally closed contacts 154a in series with the electromagnets 102, 102', etc. that operate the sensing interposers 66 into sensing contact with the various pins 56, 56'. Normally open contacts 154b are connected in series with cam contacts 122c of the teach timer 122. The series-connected contacts 154b and 122c are connected in control relation to teach motor-coupling electromagnets 100, 100', etc. and clamp electromagnets 104, 104', etc. Normally closed cam contacts 122b of timer 122 are connected in series with normally open contacts 154c of the operate-teach switch, so that when this switch is depressed in its teach position, all of the brake electromagnets 84, 84', etc. that control or lock the servo input control shafts 80 will be energized, thereby to release those shafts. Teach timer cam contacts 122d are connected in parallel with contacts 120h of "program advance" stepping electromagnet 110a. Teach timer cam contacts 122a are holding contacts in series with the motor of the teach timer, and these cam contacts are in parallel with a normally open push button switch 156. Switch 154 has normally closed contacts 154d, in series with operate timer 120, which contacts open and disable that timer during teach operations.

When it becomes necessary to advance from one program position to the next in the teaching process, switch 156 is closed momentarily, long enough for cam contacts 122a to close, after which contacts 156 are opened. The teach timer completes its cycle of operation, and then comes to rest, under control of its hold cam contacts 122a.

Normally open manual switch 154 is connected in parallel with contacts 146a. When teaching of a new program is to start and switch 154 is still in its operate position, switch 157 is closed momentarily, and shaft 106 is returned automatically to the start position of the program, as previously described.

When a new program is to be established, program shaft 106 is advanced to its start position and operate-teach switch 154 is moved to its teach position. Switch 156 is open, and teach timer 122 is at rest. Cam contacts 122b and 122c are closed, and with 154 in its teach position, devices 100 and 104 (FIG. 2) are energized. As mentioned previously, device 100 straightens or erects toggle 86, 88 and thereby provides a direct mechanical coupling between threaded shaft 92 and interposer 66. Device 104 is a strong electromagnet or a hydraulic actuator with a solenoid controlled valve or the like for causing jaw 72 and interposer 66 to clamp or grip the ends of one pin 56 that is in sensing position. At this time, contacts 122b are closed so that the lock or brake 84 that would otherwise grip input control shaft 80 of the hydraulic servo system is released. Under these conditions, the position of interposer 66 is fixed by the prevailing adjustment of threaded shaft 92. Clamp 72 drives the pin 56 tightly against interposer 66 (FIG. 2B), and spring 22g biases the servo input control shaft 80 to the left so that sensing tip 76 engages the head 70a of shaft 70 that is fixed to sensing interposer 66. As a result, hydraulic actuator 18 assumes that position which corresponds to the prevailing adjusted position of threaded shaft 92.

In shifting from operate to teach, shaft 114 is indexed 180 degrees so as to replace sensing heads 116 by demagnetizing and recording heads 118. Each of these is effective when energized (through suitable alternating current and direct current circuits not shown) to erase and then, if required, to record a magnetic spot on the surface of drum 112.

Figure 6:
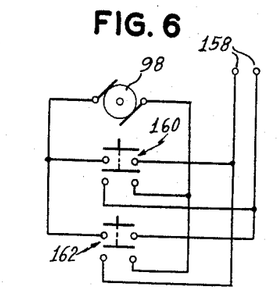

The apparatus is now in condition to be manually operated to any desired position. Motor 98 can be used to provide input to the control end of the hydraulic system and thus operate hydraulic actuator 18 to any desired position. In FIG. 6, manual switches 160 and 162 are provided for connecting motor 98 to direct current supply 158 so that the motor will operate in either desired direction. Switch 160 will produce one direction of motor operation and switch 162 will produce the opposite direction of motor rotation. Motor 98 can thus be made to rotate and, through appropriate internal reduction gearing, motor 98 drives pinion 94 so as to shift threaded shaft 92 to the right or to the left. Each motor 98 corresponding to each of the actuators 18, 18', etc. can be manually controlled using the related control switches 160 and 162 so that the working end of the apparatus represented by jaws 30 and 32 will move to the desired position. In coordination with the motion of hydraulic actuator 18, clamping jaws 66 and 72 forcibly shift pin 56 (see FIG. 2B) to the corresponding position.

When all of the motors 98 have been operated so that all of the hydraulic actuators 18, 18', etc. have moved jaws 30, 32 to the desired end position, an A.-C. erase signal is applied to each of the electromagnets 118. Thereafter, it may be desired to record a jaw operating control spot on drum 112, by energizing the appropriate magnetizing head 118. Any other desired control recording may be similarly carried out. Next, switch 156 is depressed to initiate a cycle of operation of teach timer 122. At the start of this timer cycle, contacts 122b open and all of the locking devices 84, 84', etc., are released for locking the various servo input control shafts 80. Next, contacts 122c open, devices 100, 104, 100', 104', etc. are deenergized, and elements 72 and 66 are retracted or spread to maximum extent so as to be clear of the advancing path of the next control pin 56 on drum 58. A little later in the cycle, contacts 122d close, and energize the electromagnet 110a to operate the program advance mechanism, and then open to deenergize this electromagnet. Contacts 122c then reclose and electromagnets 100, 104, 100', 104', etc. are all energized to erect the various toggles 86, 88 and to clamp the next advanced pin 56 in the same position dictated by the previous setting of threaded shaft 92. At the completion of the timer cycle, contacts 122b reclose and locking device 84 on each shaft 80 is retracted, leaving the entire apparatus in condition for manually controlled operation to the next position of the desired sequence of motions. It will be observed that each pin 56 that is newly positioned between jaws 66 and 72 is forcibly adjusted by jaws 66 and 72 to a set position determined by the previous adjustment of shaft 92. This corresponds to the setting of the last pin 56 that was advanced out of jaws 66 and 72 in any one step of the teaching sequence, and it corresponds to the position in which the servo input shaft 80 was locked during the cycle of teach timer 122. At the end of the teach timer cycle, when brakes 84 are released, the servo input shafts 80 remain in the same positions that they had at the end of the previous teach step. The various servo systems are ready to be operated through a new coordinated set of strokes, starting with the end points of the strokes previously registered in the "mechanical memory" of the apparatus.

The foregoing sequence of steps are repeated, point-by-point, until all the motions and all the control functions of the desired program have been set and recorded. When switch 154 is returned to its operate position, the apparatus repeats the established program automatically.

Figure 4:
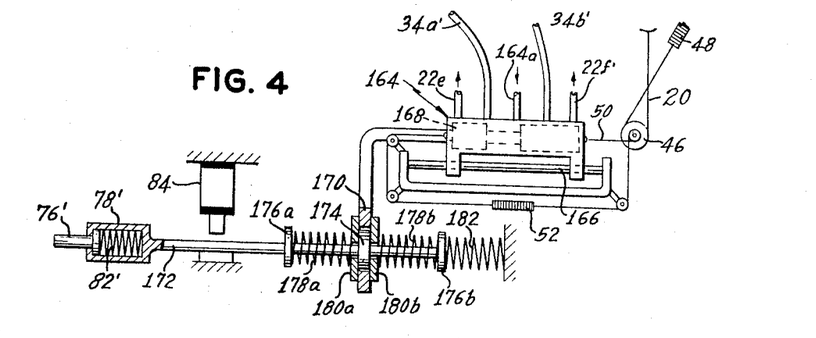
FIGURE 4 is a lateral view of a modification of one portion of the apparatus in FIG. 2, namely, a modification of part of the mechanism that couples master valve 22 of FIG. 2 to the program drum.

In the embodiment of FIG. 2, it has been assumed tacitly that spool 22c is capable of moving within the valve body through a long stroke, comparable to the total range of adjustment of pin 56 from either extreme to the opposite extreme adjustment. Thus, actuator 18 may have a six-foot stroke and the valve spool may have a six-inch stroke, in an example where there is a 12-to-1 reduction ratio at pulley 46. FIG. 4 illustrates a modification of the hydraulic input control apparatus, in which the range of motion of the control element or spool in the valve relative to the valve body is substantially smaller than the required range of adjustment of the program elements 56. In FIG. 4, cables 20 and 50, springs 48 and 52, and pulley 46 all correspond to the same elements in FIG. 2. Valve body 164 is slidably mounted on rail 166. The valve here may be of any suitable internal configuration. See for example pages 6–7 through 6–17 in "Hydraulic and Pneumatic Power for Production," by H. L. Stewart, first edition, published 1955 by The Industrial Press, 93 Worth Street, New York, N.Y.

It may be assumed that the hydraulic actuator 18 (FIG. 2) is at rest in a stable position as controlled by valve 164 (FIG. 4) which is centered so as to called for motion of the hydraulic actuator neither to the right nor to the left. Hydraulic fluid under pressure is available from the supply at line 164a. Lines 34a' and 34b' extend to the hydraulic actuator 18 as shown in FIG. 2. Hydraulic-fluid lines 22e' and 22f' provide return passages for hydraulic fluid from either line 34a' or 34b' to the low-pressure end of the hydraulic-fluid supply system. The valve spool 168 may be shifted to the right or to the left of center for correspondingly causing hydraulic fluid under pressure to flow from supply line 164a to the appropriate side of the piston in hydraulic actuator 18 for driving that actuator in the corresponding direction. As the hydraulic actuator moves, cable 42 rotates pulley 46; and through the reduction-pulley arrangement, cable 50 is shifted in the direction that corresponds to the mechanical output stroke of the hydraulic actuator. Cable 50 moves valve body 164; and after the proper mechanical output at actuator 18 is achieved corresponding to that called for by the control mechanism (to be described), the valve body and its spool are once again centered in relation to each other, and the hydraulic servo system comes to rest.

Valve spool 168 (FIG. 4) has a control part which terminates in a plate 170. Shaft 172 has an annular enlargement 174 that is received in an opening in plate 170. Shaft 172 has further enlargements 176a and 176b. Compression coil springs 178a and 178b are confined between these shaft enlargements and a pair of washers 180a and 180b. Shaft enlargement 174 is of the same thickness as plate 170, so that in the centered condition of the parts 170 through 180, washers 180a and 180b are both in engagement with the respective faces of shaft enlargement 174 and plate 170.

Shaft 172 corresponds to shaft 80 in the system of FIG. 2. Shaft 172, accordingly, bears a sensing element 76' which is telescopic within short hollow tube 78'. Spring 82' biases sensing element 76' to the left in FIG. 4, and mutually interfering portions of element 76' and 78' limit the outward extension of element 76'. The same spring operated and electromagnet retracted brake 84 is provided in FIG. 4 as in FIG. 2, and is effective to lock shaft 172 in the various adjusted positions. A spring 182 provides a normal bias of shaft 172 and sensing element 76' to the left, for cooperation with head 70a of rod 70 (FIG. 2) that is fixed to interponent 66.

When brake 84 is released, sensing element 76' is shifted to the left by spring 182 and the leftward shift of element 76 is limited by the position of interponent 66 and the shaft and shaft head 70, 70a carried thereby. While this is occurring, one of the washers 180a, 180b presses against plate 170 that is fixed to the valve spool 168, and shifts that valve spool out of its centered position that presumably exists when brake 84 is released. Valve spool 168 may be shifted to one extreme end-position or the other within valve body 164. Spring 182, however, is effective to displace shaft 172 (compressing one of the lighter springs 178a or 178b in the process) until sensing element 76' attains its intended set position. For example, it may be assumed that shaft 172 is to be displaced through a substantial stroke to the left of that in FIG. 4. This is effected by spring 182 pushing against the shaft enlargement 176b. Through a limited stroke, shaft 172 is displaced and carries plate 170 together with it. After that limited stroke, valve spool 168 is arrested by reaching the end position in valve body 164. Thereafter, any further motion of shaft 172 as called for by the apparatus that controls sensing element 76' will cause shaft enlargement 174 to shift to the left and away from washer 180b. At that time, washer 180b is arrested by plate 170.

Continuing the discussion of this example one step further, brake 84 is next actuated to grip shaft 172 and hold it in the set position. While this is occurring, the displaced valve spool 168 causes hydraulic operation of the actuator 18 (FIG. 2) that is coupled to valve body 164, in the direction to restore plate 170 in properly centered condition relative to shaft enlargement 174. Operation of the hydraulic actuator continues, causing valve body 164 to become displaced to the left because of the cable-and-reduction-pulley arrangement previously described. In due course, plate 170 will be centered opposite shaft enlargement 174; but when this occurs initially, valve spool 168 is still displaced to the left of its centered position relative to valve body 164. Hydraulic actuator 18 continues operation until the valve spool is centered relative to the valve body.

During the final portion of the hydraulic actuator stroke, as the system approaches balance, the valve causes deceleration. Prior to this final portion of the hydraulic actuator stroke, the operation proceeds at maximum speed. A longer portion of the operating stroke may ordinarily be devoted to deceleration in the form of apparatus in FIG. 2 than in FIG. 4 but, conversely, faster strokes and shorter times devoted to deceleration are obtainable with the modification in FIG. 4.

Figures 5, 5A:
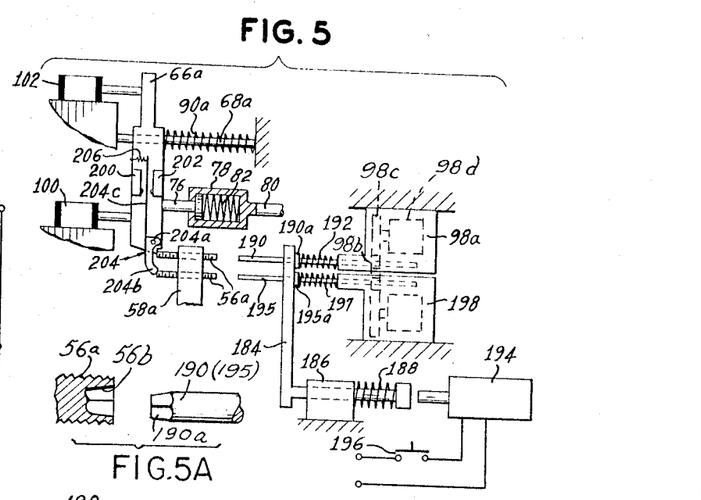

A modified program drum is shown in FIG. 5, compared to FIG. 2. In FIG. 2, pins 56 are carried in drum 58, held in position by suitable gripping arrangements such as that in FIG. 2A. Setting of a pin occurs forcibly, by controlled rotation of gear 94 when toggle 86, 88 is in its erect condition, and when a pin 56 is clamped between interposer 66 and jaw 72. FIG. 5 illustrates a modified form of mechanical memory pin, and pin setting mechanism.

In the modification of FIG. 5, drum 58a sets one of the pins 56a opposite interposer 66a in the same manner and with the same mechanism and wiring diagram involved for operating interposer 66 in FIGS. 2 and 3. Interposer 66a is slidable or rectangular guide 68a and biased to the left by spring 90a. Electromagnet 102 is energized to press interposer 66a against one of the pins 56a; and shortly thereafter (when the preceding motion has been completed) brake 84 (FIG. 2) is released. Shaft 80 and its sensing element 76 then assume the proper position corresponding to the setting of the selected pin 56a. Brake 84 is deenergized to lock shaft 80, and electromagnet 102 can then be deenergized to allow return of interposer 66a to its extreme leftward position, clear of the next pin 56a to be advanced into sensing position by drum 58a.

The mechanism and the manner of setting the pins in FIG. 5 is quite different than that in FIG. 2. Pins 56a are threaded in drum 58a, and accordingly, the setting operation in FIG. 5 requires rotational drive of pins 56a. In the discussion of this aspect of the embodiment of FIG. 5, it will be assumed that the remainder of the apparatus not represented in FIG. 5 is the same as that in FIG. 2, except that rod 70, jaw 72 and device 104 of FIG. 2 are omitted, and that the wiring diagram of FIG. 3 is the same except as is pointed out below. Switch 154 is set in its teach position. Electromagnet 100 is included in FIG. 5 to simplify the disclosure; but it could readily be omitted and its function carried out by properly switching electromagnet 102 to function during the teach operation, in addition to its described function during the operate phase. By including both electromagnets 100 and 102 in FIG. 5, the same wiring diagram of FIG. 3, and its explanation, remain valid and promotes conciseness of this disclosure.

Electromagnet 100 mechanically biases interposer 66a against one end of the pin 56a that is in control position during the adjustment of a pin 56a. The brake 84 is withdrawn to free shaft 80 so that its sensing element 76 comes into contact with interposer 66a directly. As a result, the hydraulic actuator controlled by shaft 80 assumes, the position corresponding to that of interposer 66a which, in turn, has its position established by its engagement with the particular pin 56a in effective position opposite the interponent.

For the purpose of adjusting the position of the particular pin 56a that is in line with interposer 66a, the following provision is made: A horizontally reciprocable member 184 is slidably mounted in bearing 186 and is normally biased in the retracted position illustrated, by compression spring 188. A shaft 190, slidable in member 184 and aligned with a pin 56a has an enlargement 190a at the right-hand side of member 184, and shaft 190 is biased by compression spring 192 so as to move to the left with member 184 when that member is shifted. When shaft 190 engages the directly opposite threaded pin 56a, shaft 190 stops while member 184 completes its stroke to the left. Member 184 is movable through a long stroke, equal to a little more than the total range of adjustment of the pins 56a. The right-hand ends of pins 56a are suitably formed for driving engagement with the complementary left-hand end of shaft 190. Thus, pins 56a may have so-called clutch heads or Phillips heads 56b and the left-hand end 190a of shaft 190 may be formed as a mating screwdriver, as shown in FIG. 5A. A wide wide variety of other mating arrangements are known and may be used as desired.

Shaft 190 extends to the right into a complementary shaft passage in motor 98a Conveniently, this motor may include an internally splined pinion 98d slidably receiving a complementary portion of shaft 190; and further it may include a drive gear 98c and an electric motor 98d. An electromagnet 194 is provided for shifting member 184 to the left, as already described, and a manual switch 196 is provided for controlling the energization of this electromagnet 194.

When a pin 56a is to be set, for establishing the end point of a given programmed stroke of the apparatus, switch 196 is closed and shaft 190 is shifted into driving relationship with the pin 56a that is engaged by interposer 66a. Motor 98a is operated for rotation in either one direction or the opposite under control of a circuit like that provided in FIG. 6 for motor 98. As the motor rotates shaft 190, screw 56a advances to the left or to the right, depending on the direction of motor drive. Interposer 66a follows pin 56a, due to pressure by electromagnet 100, and the related servo system follows interposer 66a. Movement of the motor and of the whole servo system as described will shift the mechanical output end of the controlled hydraulic actuator to a position that is more fully extended or retracted, depending upon which switch 160 or 162 is manually closed. In this way, each pin 56a is correspondingly set to a desired programmed adjustment, and the drum is then indexed.

Another shaft 195 is also carried by member 184, and spring 197 biases shaft enlargement 195a to the left against member 184. Another motor 198, exactly the same as motor 98a, is arranged to rotate shaft 195. The latter shaft has its formed end aligned with the complementary end of the next pin 56a that is to be moved into cooperation with interposer 66a when drum 58a is next indexed one step.

Figure 7:
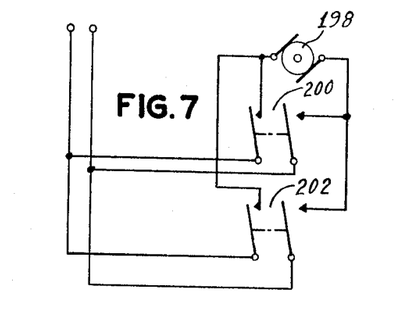
Figure 8:
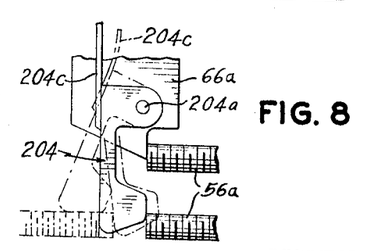
FIGURE 8 is an enlarged detail of that portion of FIG. 5 which involves sensing interposer 66a and pins 56a, one part 204 being shown in broken lines in two positions assumed thereby additional to the position shown in solid lines.

Motor 198 may be rotated in either direction for driving the corresponding pin 56a to the left or to the right, and for this purpose motor 198 is controlled by the circuit in FIG. 7. A first switch 200 and another switch 202 which are connected in the usual manner to cause forward and reverse motor operation, and the motor is idle if both switches are open. These switches are of a sensitive type, and operate with snap action such as the microswitch. They are mounted on interposer 66a. A lever 204 has a pivot 204a directly above the point where interposer 66a engages the cooperating pin 56a. The lower end 204b of this lever engages that threaded pin 56a which is in line with shaft 195. Another arm 204c extends upward between the actuators of the normally open switches. A tension spring 206 biases lever 204 counterclockwise. Arm 204c of the lever is resilient, so that at those times when engaged pin 56a extends much farther to the left than pin 56a engaged by interposer 56a, lever arm 204c can simply flex while its upper end remains between the two switches 200 and 202. In this assumed condition of relative adjustment of the two pins 56a that engage interposer 66a and lever arm 204b, the latter lever arm will swing clockwise and ultimately allow pin 56a to move below it. (See also FIG. 8.) Under these conditions, the upper lever arm 204c keeps switch 202 closed and causes motor 198 to rotate in that direction to move the corresponding pin 56a to the right. In due course, the two pins, 56a that are engaged by interposer 66a and by lever arm 204b, respectively, will be in alignment with each other.

Similarly, if the lower pin 56a that is to cooperate with lever arm 204b is initially displaced to the right of the upper pin 56a that engages interposer 66a, then spring 206 will pull lever arm 204c to the left and will close switch 200. Motor 198 will be operated for rotating the lower pin 56a so as to shift that pin toward and into alignment with the upper pin 56a in FIG. 5.

During manual adjustment of the upper pin 56a that cooperates with interposer 66a and determines the position of the related hydraulic actuator, motor 198 automatically operates to maintain the lower pin 56a in alignment. Consequently, when one pin 56a has been set by shaft 190 for determining a particular point in the program of motions of the hydraulic actuator, the next pin 56a carried by drum 58a assumes that same position. During the teach operation, indexing of the drum is effected as previously by closing switch 156 (FIG. 3) momentarily. The lower pin 56a of FIG. 5 is advanced into line with interposer 66a, which is then shifted against pin 56a before the brake 84 is released. The hydraulic servo is then controlled by the newly advanced pin 56a. The positions of sensing element 76, shaft 80, and the remainder of the hydraulic servo system are the same after drum advance as before, since both the previous pin 56a and the newly advanced pin 56a have the same setting.

The second pin 56a that has thus been moved into axial alignment with shaft 190 is in condition to be adjusted so as to establish the next part of the servo control program. The following pin 56a on drum 58a that is advanced into line with shaft 195 is in some random position; but when switch 196 energizes electromagnet 194, shaft 195 moves into engagement with that newly advanced pin 56a; and operation of motor 198 automatically adjusts that newly advanced pin 56a into position corresponding to the (then) upper pin 56a in FIG. 5. In this manner, the end-point of each operating stroke in the program of the actuator 18 is established using the apparatus of FIG. 5 by setting the upper pin 56a to the appropriate position; and while this is taking place, the next pin 56a carried by the drum is also automatically set to the same position. Consequently when the drum advances one step and positions a new pin 56a opposite interposer 66a, the input end and the output end of the hydraulic servo remain in the same places as when they were controlled by the previously set pin 56a. The newly advanced pin 56a is thus in the starting position corresponding to previous position of the output end of the servo. The pin 56a that newly cooperates with interponent 65a is thus in condition to be adjusted coordinately with the output end of the servo system to move to and establish the end-point of the next-following stroke and to retain that adjustment as one point in the program.

In the embodiments of the invention shown in FIG. 2, as well as that in FIG. 4 and in FIG. 5, the hydraulic servo maintains a constant ratio between the output end of the system and the smaller range of motion of the master element 80 or 172. As diagrammatically illustrated in FIGS. 2, 4 and 5, that ratio is established by the ratio between the small-diameter part of pulley 46 (FIG. 2) and the large-diameter portion of that pulley. This ratio need not be a constant one, however, but may be made deliberately adjustable, in any of a variety of ways well-known to those skilled in the art. Furthermore, the servo system in each of the embodiments above is hydraulic; and while this has various distinctive advantages, it is contemplated that the broader aspects of the invention can be accomplished using other known types of servo systems. So-called L.V.D.T. (linear voltage displacement transformer) and other servo systems may be used in place of the hydraulic servo involving master valve 22 and hydraulic actuator 18 in FIG. 2. Such a system is illustrated in FIGS. 12 to 14, in which parts identical to those in FIGS. 1 and 2 bear the same numbers as appear in FIGS. 1 and 2; and such identical parts and the description of their operation are not repeated here.

Figure 13:
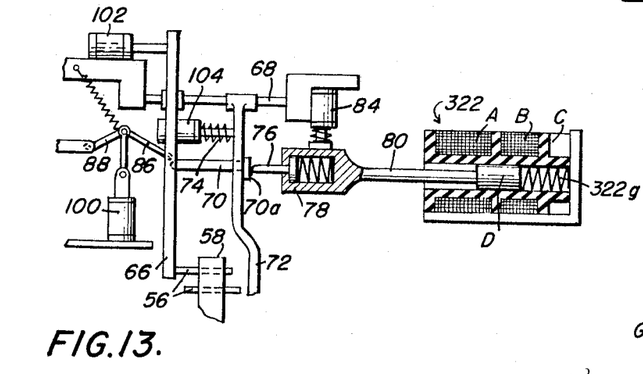
FIGURE 13 is a fragmentary somewhat diagrammatic lateral view of the program control apparatus of FIG. 2, modified to substitute an L.V.D.T. for the master valve 22 of the hydraulic servo in FIG. 2.
Figure 14:
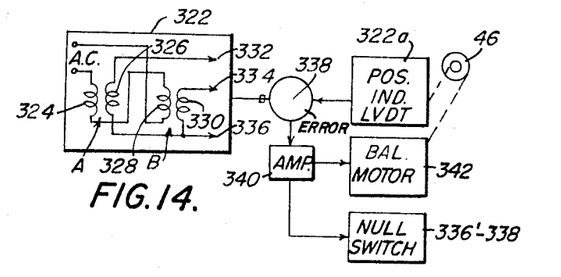
FIGURE 14 is a block diagram of an L.V.D.T. servo controlled by the L.V.D.T. of FIG. 13 for controlling the in-and-out motion of shaft 24 in FIG. 12.

An L.V.D.T. input unit 322 appears in FIG. 13 as a replacement for the valve 22 in FIG. 2. This L.V.D.T. includes a first two-winding coil A and a second two-winding coil B on a nonmagnetic shell C. A core D of low-loss high-permeability magnetic material is slidably supported in the bore of shell C and attached to shaft 80 for input mechanical control. Spring 322g (corresponding to spring 22g of FIG. 2) biases core D and shaft 80 to the left, for cooperation with the remainder of the program mechanism illustrated in FIG. 13. This is more fully shown in FIG. 2 and described in that connection. It will be understood that the omitted portion of fragmentary FIG. 13 is to be found in FIG. 2, and the showing is not duplicated in FIG. 13.

Three L.V.D.T.'s 322, 332' and 322" are contained in the apparatus base 10 (FIG. 12) to act as the master portion of a servo that controls the slave actuators 18, 18' and 18". These actuators may be identical to those in FIG. 1, but these actuators are motors that are controlled by the L.V.D.T. servo systems. One L.V.D.T. servo system is provided for each of the actuators or motors. The servo system of which L.V.D.T. 322 is a part includes a companion L.V.D.T. 322a mounted on the in-and-out actuator 18 and coupled to shaft 24 by cable 50, ratio pulley 46, and cable 20. In an L.V.D.T. servo system, as shown in FIG. 14, there is a control L.V.D.T. 322 and a position indicating L.V.D.T. 322a which are both of the construction illustrated in FIG. 13. As shown in FIG. 14, the coil A includes a primary winding 324 and a secondary winding 326. Coil B includes a primary winding 328 and a secondary winding 330. Primary windings 324 and 328 are connected in series and to a source of alternating current, and secondary windings 326 and 330 are also connected together, and their junction and terminals provide output. The output appearing at terminals 332 and 334 relative to junction 336 of coils 326 and 330 is zero, when core D is centered between coils A and B (FIG. 13). The relative connections of the primary and secondary windings and their connections to each other as described above is such that the output developed in secondary winding 326 is equal and opposite to that of secondary winding 330 when core D is centered. The output of L.V.D.T. 322 is applied to an error-detecting unit 338 and compared with the output of L.V.D.T. 322a. The error or mismatch signal is applied to amplifier 340 and, in turn, to balancing motor 342. In the case of a hydraulic actuator, motor 342 in FIG. 14 represents both a control valve and the reciprocating actuator 18 of FIG. 1. Balancing motor 342 is coupled to position indicator L.V.D.T. 322a through the cables and ratio pulley 46 described in connection with FIGS. 2 and 12. The output of error-detection unit 338, emerging from amplifier 340, also controls a null switch 336–338 corresponding to balance-detection switch 36 and 38 in FIGS. 2 and 3.

Figure 12:
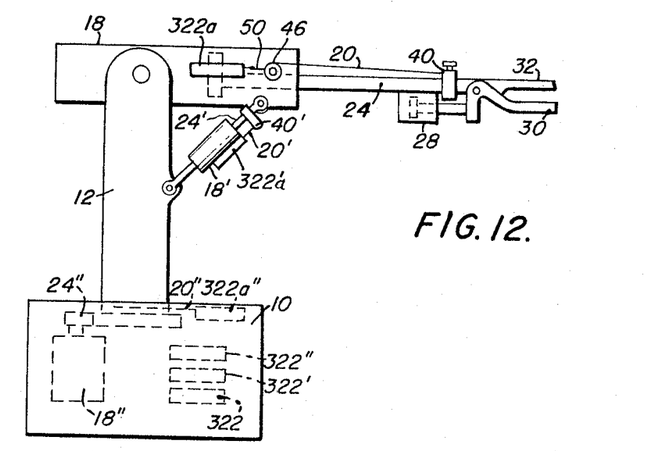
FIGURE 12 is the lateral view of a modification of the apparatus in FIG. 1.

The operation of the L.V.D.T.-controlled apparatus in FIG. 12 is very similar to that in FIGS. 1 and 2, which is here briefly reviewed. It may be assumed that null-switch 336–338 has closed and that another mechanical motion of the apparatus in FIG. 12 is to occur in accordance with the previously recorded program. Motor 120 (FIG. 3) goes through a cycle, and near the start of that cycle brake 84 is released, allowing shaft 80 to assume a new position corresponding to the setting of sensing interposer 66 and its shaft 70. Brake 84 is then reapplied, holding shaft 80 in its adjusted position and thereby holding core D of the L.V.D.T. in its adjusted position. Sensing interposer 66 is next retracted and pin drum 58 is indexed as described in connection with FIG. 2, in order for the next pin 56 to establish a new setting for sensing interposer 66. During that program advance, hydraulic actuator 18 operates shaft 24 to assume the position dictated by the core D of the control L.V.D.T. 322. As soon as output shaft 24 has assumed the proper position, position-indicating L.V.D.T. 322a has assumed the position accurately corresponding to that of L.V.D.T. 322. Upon completion of that motion, null switch 336–338 closes once again to initiate the next part of the recorded program.

It has been indicated above that pulley 46 is illustrative of a number of adjustable ratio couplings that may be used between cable 50 and cable 20, and a reduction gear assembly was mentioned as one alternative. Reduction gearing is shown in FIG. 10, illustrating a further feature of the invention. Only one train of gears is shown, but it should be understood that gears of various ratios may be substituted to establish the desired ratio.

In FIG. 10, pulley 210 is at the long-travel end of the reduction gear unit 46′ that is a substitute for unit 46 in FIG. 2, and pulley 212 is at the short travel end of the unit. Pulleys 210 and 212 at one side of support 214 are coupled by gears 216, 218, 220 and 224. Gear 216 is fixed to the same shaft 224 that carries pulley 210. Gears 218 and 220 are keyed together. Shaft 226 is fixed to pulley 212, and supports gear 222. Hand wheel 228 may be tightened to clamp gear 222 against the flanged portion of shaft 226, thereby completing the drive train between pulleys 210 and 212. This is the usual condition during operation of the apparatus.

Hand wheel 228 may be loosened to allow gear 222 to become free-running and uncoupled from pulley 212. It may be presumed that this occurs when the servo valve 22 and the hydraulic actuator 18 are in balance and the servo system is at rest. Loosening gear 222 has no effect. However, it now becomes possible to operate pulley 212 by manipulating knob 230 on the pulley supporting shaft 226. When knob 230 is turned, pulley 212 and cable 50 shift valve body 22a in relation to spool 22c. This causes actuator 18 to operate, fast or slow in dependence on the extent of knob rotation. In this way, it is possible to produce operation of the hydraulic actuator under manual control, independent of the program control apparatus and without disturbing the established program.

This facility is of importance in various circumstances. For example, the apparatus in FIG. 1 may have an established program as represented by the setting of pins 56, 56′, etc. and the recording on drum 112. The program may be arranged to transfer articles from the delivery end of a belt conveyor to rows and columns on a pallet. In this condition the whole apparatus may be removed from one conveyor and set up to operate according to the same program at a new location. It may not be feasible to adjust the base of the apparatus in its new position with the required accuracy. In any event, it is desirable to avoid the requirement for the apparatus to be set up with precision in its new location. The starting point of each of the various servo systems can be adjusted, with the power assistance of the servos, using an adjustment within the servos such as that in FIG. 10 and without critical positioning of the base of the apparatus. A similar effect can be realized by making a dimensional change in the servo system, as by means of clamp 40 (FIG. 1). By providing the manual servo control such as that in FIG. 10, another initial positioning control is made available that is unusually accessible and easily operated. After manual controls of the servos is finished and the various portions 12, 18 and 24 have attained their desired starting positions, the starting orientation of jaws 30, 32 is set by tightening clamp 228.

Figure 9:
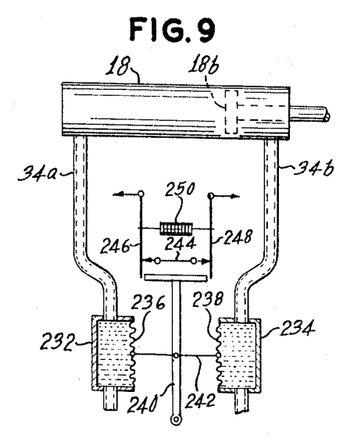
FIGURE 9 is a modification of another portion of FIGS. 2 and 3, namely, a modification of the pressure-switch means for sensing the balance or at-rest condition of the hydraulic servo system 18, 20, 22.

The apparatus of FIGS. 2 and 3 utilizes a hydraulic servo, and incorporates one pressure switch in each line of the hydraulic actuator. That arrangement is effective when used with valves which open both actuator lines to exhaust when the supply line is shut off by the valve in its centered condition. A more generally applicable control replacing pressure switches 36 and 38 and the contacts 36a and 38a (FIG. 3) is shown in FIG. 9. Lines 34a and 34b contain chambers 232 and 234 having diaphragms 236 and 238 connected to each other and to pivoted T-shaped member 240 by a rod 242. A stationary double-ended contact element 244 is engaged by pivoted contact elements 246 and 248 that are biased toward each other by tension spring 250, but electrically insulated from this spring.

In the centered condition of the servo, both lines 34a and 34b have equal pressure. This may be the exhaust pressure or it may, conceivably, be some higher pressure due to the nature of the control valve 22. In any event, when piston 18b comes to rest there are equal pressures at its opposite sides. With this pressure equality, member 240 is centered and both elements 246 and 248 are in contact with the ends of element 244. If there is any unbalance of pressures, energy presumably is being supplied to actuator 18, or at any rate the servo system is off its null condition; and in that condition of the servo, member 240 moves one or the other element 246 or 248 out of contact with element 244. This breaks the series circuit 246–244–248, with the same effect in the control circuit (FIG. 3) as if one of the switches 36a or 38a were open. The arrangement of FIG. 9 does not depend upon disappearance of pressure in both lines as an indication that the servo has attained its balanced condition. Instead, the balanced condition of diaphragms 236 and 238 will provide the representation of balance that exists even if the particular hydraulic system used should trap fluid under pressure when balanced.

The apparatus of FIGS. 2 and 3 involves a sequence of functions that results in a rapid sequence of motions without undue loss of time between each stroke and the next. In that apparatus the destinations to be assumed at the work output end of each servo are represented in analog form by the positions of pins 56, 56′, etc. While that apparatus achieves its own special results and has unique advantages, the rapid sequence of functions mentioned above can be attained with so-called digital program control means. Such apparatus is shown in FIG. 11, which apparatus incorporates further novel features, as will appear in the following discussion.

Figure 11:
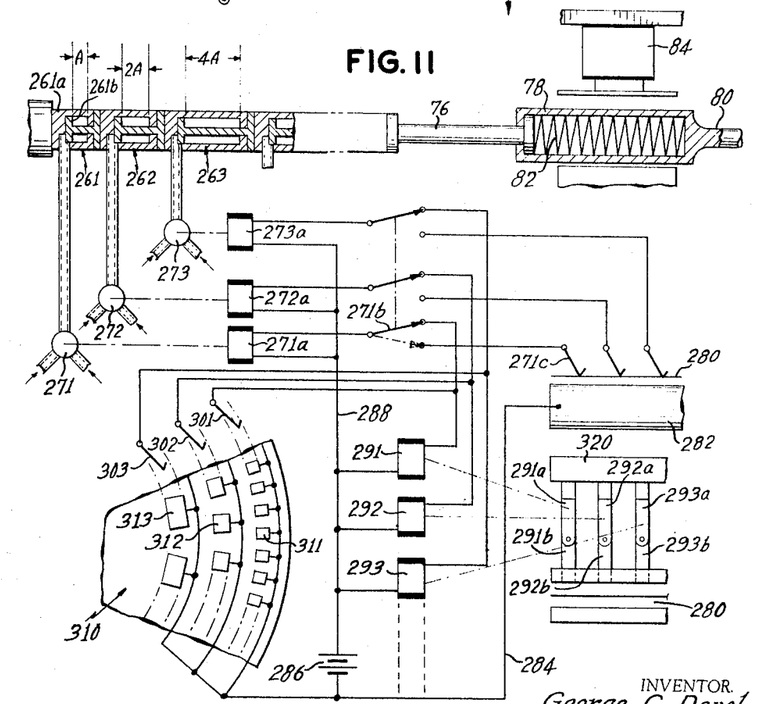
FIGURE 11 is a diagrammatic illustration of another embodiment of certain aspects of the invention, the modification of FIG. 11 being suitable as a substitute for the servo control and program-establishing means represented by parts 56, 58, 66, 70, 72, 74, 86, 88, etc.

In FIG. 11 sensing tip 76 and telescopic element 78 and compression spring 82 represent the input end of a hydraulic servo, the remainder of which appears in FIG. 2. Brake 84 includes an internal spring that is effective for applying the brake to part 78, and the brake is released when the electromagnetic part of brake 84 is energized.

A cascade of hydraulic actuators 261, 262, 263, etc. are arranged in line and slidably supported in line with sensing tip 76 at one end and blocked at the opposite end.

Actuator 261 includes a cylinder 261a and a piston 261b that extends outside cylinder 261a and bears against the cylinder end of unit 262. Piston 261b has an accurately established clearance in cylinder 261a so that, when hydraulic fluid enters the left-hand end of the cylinder, the piston moves through a stroke A. Unit 262 has an internal clearance between its piston and its cylinder such that it effects a stroke 2A when actuated, that is, twice the stroke of unit 261. Likewise, unit 263 is proportioned to provide a stroke 4A, and so on, all of the additional units having successively doubled strokes, in sequence. The number of units and their strokes are chosen to fit the requirements for maximum length of stroke and maximum permissible error between the stroke that the apparatus can make and the stroke desired. The maximum error will necessarily be $A/2$.

Valves 271, 272, 273, etc. and their related operating electromagnets 271a, 272a, 273a, etc. are operable to deliver hydraulic fluid under pressure to units 261, 262, 263, etc. or to dump fluid from those units into the exhaust part of the hydraulic system. Electromagnet 271a is connected by a selector switch 271b to a sensing brush 271c in one position of this switch, that is, the dotted-line operate position. Brush 271c rests on a perforated program control member 280 as a strip of paper or card sequence that rests on conductive roller 282. In the event that a perforation is sensed by brush 271c, an energizing circuit for electromagnet 271a is established through switch 271b in its dotted-line position, brush 271c, cylinder 282, wire 284, electric power source 286, and wire 288. Similar circuits may be traced from the other electromagnets to the corresponding brushes. Each row of perforations (or imperforate areas) under the row of brushes provides a means for representing a destination to which the servo is to drive. The cascaded hydraulic actuators and their control valves and electromagnets comprise an operator for the servo input control, and this operator is responsive to the combination code signals from the sensing brushes.

The apparatus represented in FIG. 11 is a modification of a portion of the system in FIGS. 2 and 3, and its coordination is the same as in FIGS. 2 and 3. The feed of the perforated control member 280 is effected by customary feeding means (not shown) geared to shaft 106 (FIG. 2) and the timing and coordination of brake operation, record-feed, etc., is provided by circuits shown in FIG. 3 and fully discussed above. All of the apparatus interposed between perforated control member 280 and the sensing tip of the servo operate to present each new displacement instruction to the servo while the servo is proceeding to the previous destination under control of its input part 78 that is held in its previous setting by brake 84. As soon as it reaches the previously instructed destination, the servo is released by brake 84 and quickly assumes a new setting in accordance with the combination of pressurized units 61, 62, 63, etc. The brake is reapplied, and the programming resumes as before. The successive strokes follow in sequence with almost no pause between strokes except such as is dictated by other coordinated functions and deliberately programmed dwells.

The apparatus of FIG. 11 is adapted to teach the control member 280 a sequence of motions quickly and in a way to reproduce a manually controlled sequence. For this purpose, switch 271b and the others ganged to it are set in the solid-line position shown. In this position, electromagnets 271a, 272a, and 273a, etc. are connected in parallel with punch-control electromagnets 291, 292, 293, etc. and to brushes 301, 302, 303, etc. of a shaft-position encoder having a disc 310 bearing rows of areas 311, 312, 313, etc. providing unique codes corresponding to each discrete position or space between areas 311. The codes progress in binary numerical sequence around disc 310.

By operating disc 310 manually (and with brake 84 released as in the teach condition of FIG. 3 that supplements FIG. 11) input can be provided for energizing electromagnets 271a, 272a, 273a, etc. and for operating hydraulic units 261, 262, 263, etc. to control the servo in any desired manual motions. Electromagnets 291, 292, 293, etc. are coupled to punch-control interponents 291a, 292a, 293a, etc. These electromagnets are energized in accordance with shaft-control interponents, the position shown. At the end of each stroke desired, punch head 320 is operated to drive selected punches 292b through a card or strip 280' in forming one destination-representing punched code. Where there are slanted interponents, out of line with projections on the punch head, the corresponding punches are idle. Successive servo motions and punching of corresponding codes are carried out in sequence. Card or strip 280' is then in condition to be fed under brushes 271c, etc., when the sequence of motions is to be repeated automatically.

It will be recognized that many changes in the above embodiments of various aspects of the invention and varied combinations of the novel features disclosed above will occur to those skilled in the art, and consequently the invention should be construed broadly, in accordance with its true spirit and scope.

What is claimed is:

1. Automatic control means for operating a machine to a succession of precisely determined positions in accordance with a succession of positional instructions, including a mechanical output device, a servo system having an output portion for operating the mechanical output device through a range of positions, a sensing interposer, said servo system having a servo input control member cooperable with said sensing interposer, means to present mechanically to the sensing interposer a succession of positional instructions, means to cause the interposer to assume a position corresponding to the prevailing mechanically presented instruction of the instruction-presenting means, and means for effecting mutual coaction of said servo input control member and the interposer.

2. Control apparatus in accordance with claim 1, further including means to lock the servo input control member in a set position as established by its coaction with said interposer, and means coordinated with the locking means to cause the interposer to seek another position in accordance with said instruction-presenting means while the servo system operates the mechanical output device into the position corresponding to the locked position of the servo input control member.

3. Automatic control means for operating a machine to a succession of precisely determined positions in accordance with a succession of positional instructions, including a mechanical output device, a servo system for operating the mechanical output device through a range of positions, said servo system having a servo input control member, means to hold the servo input control member releasably in any selected position, and programmed position selecting means for said servo input control member including a control device and means to condition the control device to seek a prescribed new position while the servo input control member is held in a previous setting, and means causing said programmed position selecting means and said servo input control member to assume successive new settings to control the servo system for operating the mechanical output device to successive new positions.

4. Automatic control means for operating a machine to a succession of precisely determined positions in accordance with a succession of positional instructions, including a work device, a servo system capable of operating the work device through a range of positions, said servo system having a servo input control member, means to lock the servo input control member in any selected position, means to establish a mechanical representation of another positional instruction while the servo input control member remains locked and while the work device is in motion toward the position corresponding to the locked position of the servo input control member, and means for concurrently unlocking the locking means and causing the servo input control member to coact with said instruction establishing means for causing operation of the servo to another position.

5. Automatic apparatus operable to a succession of precise programmed positions including a program controller having a series of preset elements and means to advance said elements successively to sensing position to provide a succession of programmed positional instructions, a mechanical output device operable to any position corresponding to the settings of said elements, a servo system including an output portion for operating said mechanical output device, said system including a servo input control member, position determining means including an interposer and means operable alternately to retract the interposer out of the path of advance of the preset elements and to effect coaction of the interposer with the preset element newly advanced into sensing position to assume the successive positions of said preset elements, and means operable at intervals to readjust said servo input control member in accordance with the assumed positions of said position determining means.

6. Automatic apparatus operable to a succession of precise programmed positions including a program controller having a series of preset elements and means to advance said elements successively to a sensing position to provide a succession of programmed positional instructions, a work device operable to any position corresponding to the settings of said elements, a servo system for operating said work device, said system including a servo input control member, interposed position determining means controlled by said program controller to assume the positions of said preset elements successively advanced to sensing position, and means operable at intervals to readjust said servo input control member in accordance with the assumed positions of said interposed position determining means, said apparatus further including means effecting cooperation of said interposed position-determining means with each successive preset element while said servo system is under control of said servo input control member in a previous setting.

7. A programmed servo including servo control means having a servo control member, a servo actuator controlled by said servo control means and a mechanical output device operable by said actuator through a range of positions, and program control means for said control member, said program control means including a program controller having a plurality of control elements individually settable to respective settings corresponding to any position in the range of positions of said mechanical output device, interposed means for coupling a selected one of said control elements to said control member of said servo control means, said programmed servo also having program establishing means operable to adjust said servo control member for causing said actuator to operate said mechanical output device to a desired position in said range of positions and to adjust a selected one of said elements to a setting corresponding to said desired position.

8. A programmed servo, including servo control means having a control member, a servo actuator controlled by said control means and a work device operable by said actuator through a range of positions, and program control means for said control member, said program control means including a program controller having a plurality of control elements individually settable to respective settings corresponding to any positon in the range of positions of said work device, interposed means for coupling a selected one of said control elements to said control member of said servo control means, said programmed servo also having program establishing means operable to adjust said control member for causing said actuator to operate said work device to a desired position in said range of positions and to adjust a selected one of said elements to a setting corresponding to said desired position, and selective means for either rendering said setting means operative to adjust said control member and said selected element or for disabling said setting means and subjecting said servo control member to control by said program control means.

9. Programming apparatus for a servo operated device having an input control member, said apparatus including a program controller having a sequence of position determining elements respectively adjustable to a sequence of settings corresponding to a sequence of desired positions in the operative range of the servo operated device, an interposer cooperable successively with selected ones of said adjustable elements, a brake operable to lock said input control element in position while the servo operated device advances toward the corresponding position, means biasing said input control element into cooperation with said interposer, and control means for controlling said brake and effective momentarily for releasing said brake to cause said interposer and said biasing means to adjust said input control member into position corresponding to said selected adjustable element, and said control means being effective thereafter for applying the brake to relock the input control element in its new position.

10. Programming apparatus in accordance with claim 9, further including means for retracting said interposer, means for operating said program controller to advance a new position determining element into position for cooperation with said interposer, and timing means for successively causing operation of said interposer retracting means, operating said program controller to advance a new position determining element as aforesaid, and then causing said interposer to cooperate with said new position determining element, said timing means operating as aforesaid between the time that said brake is applied and the time said brake is released.

11. Programmed apparatus in accordance with claim 9, including means responsive to the operating state of the servo for maintaining said brake applied until the servo-operated device has reached its position corresponding to the setting of said input control member.

12. Programmed apparatus, including a program controller having a series of individually adjustable control elements, a servo operated device having a servo input control member, means cooperable with said member and with said elements individually in sequence for effecting programmed operation of said device to a series of discrete preset positions, and setting means for adjusting said elements to establish a desired program, said setting means having means for driving a selected one of said control elements and said input control member into corresponding positions to operate said device to a first position, means to hold said servo input control member releasably in its operated position, means to retract said driving means and means to advance the program controller for presenting a new control element into cooperation with said driving means, and means for thereafter causing said driving means to drive said new control element to the same setting initially as the previous control element in preparation for driving said servo input control member and said new control element to other positions in establishing a succeeding setting of the program.

13. Programmed apparatus in accordance with claim 12 wherein said holding means includes a brake and control means therefor to apply the brake before said driving means is retracted and to release the brake prior to operation of said driving means to establish a new setting.

14. Programmed apparatus, including a servo operated mechanical output device having a servo input control member, a program controller having a series of elongated screw-threaded control elements individually adjustable through a range of positions corresponding to the range of positions to be assumed by said servo input control member, said program controller including means to advance said screw-threaded control elements in a sequence into sensing position, interposer means for adjusting the servo input control member in accordance with said screw-threaded control elements in sensing position individually in said sequence for effecting programmed operation of said device to a series of preset positions as determined by said screw-threaded control elements, and setting means operable to adjust a selected screw-threaded control element while the latter is in control of said servo input control member for operating said mechanical output device to a desired position so that each selected screw threaded control element in sensing position assumes a set position corresponding to the position of the servo-operated mechanical output device as one of the preset positions in a new program.

15. Apparatus in accordance with claim 14, further including automatic means cooperable with the next screw-threaded control element of the sequence during the aforesaid adjustment of said selected screw threaded control element for adjusting that next screw threaded control element to the same setting as that of said selected screw threaded control element.

16. A programmed machine for automatically operating a mechanical output device to a sequence of positions in accordance with a succession of positional instructions, said machine including a hydraulic actuator for said mechanical output device, servo valve means having a servo input control member and a feedback connection between said actuator and said valve means, program control means for providing a succession of discrete position instructions mechanically, means cooperating with said program control means to shift said servo input control member abruptly to each successive new position in accordance with the position instructions, the servo valve means acting inherently to decelerate said mechanical output device in approaching each new position under control of said servo input control member.

17. Automatic control means for operating a machine through a programmed sequence of motions, said control means including an actuator, servo control means having a servo input control member, feedback coupling means between said actuator and said servo control means, programmed position control means for causing said input control member to operate through a succession of strokes, said feedback coupling means including a changeable ratio device for determining the proportionality ratio of the strokes of said servo input control member to the strokes of said actuator.

18. A programmed machine for automatically operating a work device through a sequence of strokes including a hydraulic actuator for said work device, servo valve means having a pair of hydraulic lines to said actuator for effecting operation thereof in opposite directions and having a feedback connection to said actuator, said servo valve means also having a servo input control member, programmed control means for causing said servo input control member to assume a sequence of control positions and thereby effecting corresponding operation of said work device, and pressure sensitive means in said hydraulic lines for initiating operation of said programmed control means to render the next step in the program effective after completion of each program controlled stroke program effective.

19. A programmed machine for automatically operating a mechanical output device through a sequence of strokes and coordinately effecting related functions, said machine including a function program controller and at least one positional program controller coordinated therewith, servo means for operating said mechanical output device through a series of positions under control of said positional program controller, said servo means including a device for signalling completion of the servo operation to each of said series of positions, said servo means including an actuator for the mechanical output device and a master control for the actuator, said master control including a servo input control member, said positional program controller including a mechanical instruction representing element adjustable in position in correspondence with the position to be reached by the mechanical output device, means for effecting cooperation of said servo input control member and said mechanical instruction representing means, holding means for locking said servo input control member in an adjusted position, means effecting a function on an article movable by said mechanical output device, and timing means responsive jointly to said signalling device upon completion of each programmed stroke and to said function effecting means upon completion of the function thereof for advancing said program controllers to another portion of the program thereof, said timing means controlling said holding means for causing resetting and relocking of the servo input control member between the time of completion of an operation of said mechanical output device and a time when neither is said program controller advancing nor is said function-effecting means effecting an operation on an article.

20. A programmed servo operated article handling machine, including an article holder, a servo system including an actuator for operating said article holder through a range of positions, servo control means for controlling said actuator, a mechanical input element for controlling said servo control means, and a feedback coupling between said actuator and said servo control means for adjusting the latter into positions corresponding to positions assumed by said actuator, program control means in control relation to said input element, and means for effecting a change of position of said article holder without disturbing the program of said program control means, the last-named means including an adjustable connection in said feedback coupling for enabling manually controlled servo powered operation of said article holder into an adjusted position relative to another apparatus with which the article handling machine is to cooperate while retaining undisturbed the program of the program controller.

21. Programmed apparatus including a work element, a servo for operating said work element, said servo including a servo master control having an input control element, an actuator for said work element, control and feedback coupling means between said actuator and said servo master control, a program controller cooperating with said input element, and means for adjusting the position of said work element, said means including manually operable means in said coupling means for introducing a displacement between said master control and said actuator and thereby effecting powered shift of said work element without disturbing the program of said program controller.

22. The method of establishing a program in a program controller having a sequence of program elements settable into analog positions corresponding to the desired programmed positions of a work element, including the steps of adjusting a program element while correspondingly controlling the input end of a servo system that actuates such element, holding said input end of the servo system fixed, and both adjusting the next program element to the final setting of the immediately prior program element and advancing said next program element into cooperation with said servo input end, releasing said input end, and cyclically repeating the recited steps.

23. Programmed apparatus including a servo system having an input control element and an output work element, a brake operable alternately to hold the input control element in any set position and to release said input control element to assume a new set position, a program control member having respective destination representing means in each of a sequence of positions, said program control member being operable successively from each position to another of said sequence, interposed means having an output portion cooperating with said input control element and having a sensing portion cooperating with said program control member, said interposed means being operable to displace the output portion thereof in accordance with each sensed destination representing means, and coordinating means controlling said brake and said program control member, said coordinating means being effective to apply said brake during the time said program control member is advancing and to release said brake when said interposed means is in condition to displace its output portion.

24. Apparatus for effecting successive decelerated movements of an article holder under program control, including program control means for producing successive combination-code signals, an operator responsive to said signals and having a plurality of components operable in successive selected combinations in accordance with said combination-code signals, each said component when operated producing a respective predetermined operating motion, said operator having an output part coupled to said components and operable thereby in response to each combination-code signal through a stroke corresponding to the combined motions of the selected combination of said components, and a servo system having a master control and a slave mechanical output element, said servo system being of a form providing decelerated operation of the mechanical output element as the latter approaches the end of each stroke dictated by each displacement of the master control, said master control being connected to said output part for operation thereby, and an article holder mechanically connected to said output element of the servo system for operation thereby through a succession of program-controlled decelerated strokes.

25. Programmed apparatus, including a mechanical output element, a servo system for operating said mechanical output element including an actuator and a servo master control coupled to said actuator, said master control having an input element, and a program controller in control relation to said input element, said program controller including a cascaded series of displacement-producing components, and program controlled means for selectively actuating any one or more of said components and thereby determining the position of said input element of the master control in dependence on which of said components have been actuated, said programmed apparatus further including a brake for arresting said input control element, and coordinating means causing said brake to arrest said input control element in one program-controlled setting while said program controller advances to select the next combination of said components.

26. Programmed apparatus, including a mechanical output element, a servo system for operating said mechanical output element including an actuator and a servo master control coupled to said actuator, said master control having an input element, and a program controller in control relation to said input element, said program controller including a cascaded series of displacement producing components, and program controlled means for selectively actuating any one or more of said components and thereby determining the position of said input element of the master control in dependence on which of said components have been actuated, said apparatus further including a shaft position encoder, means for rendering said displacement producing components responsive to said shaft position encoder and at the same time causing said input element of the servo master control to conform to said displacement producing components and thereby cause operation of said mechanical output element according to that of said shaft position encoder, and selectively operable program recording means coupled to said shaft position encoder and selectively operable under control thereof for recording a sequence of combination-code position instructions.

27. Programmed apparatus in accordance with claim 24, wherein said components are stacked hydraulic actuators related to each other to produce a progression of successively doubled displacements.

References Cited by the Examiner
UNITED STATES PATENTS

| | | | |
|---|---|---|---|
| 1,965,281 | 7/1934 | Deisch | 74—10.1 |
| 2,217,342 | 10/1940 | Ladrach. | |
| 2,852,727 | 9/1958 | Barnett | 318—467 |
| 2,861,699 | 11/1958 | Youmans. | |
| 2,861,701 | 11/1958 | Bergsland. | |
| 2,933,205 | 4/1960 | MacDonald. | |
| 2,959,301 | 11/1960 | Willsea. | |
| 2,988,237 | 6/1961 | Devol | 214—11 |
| 3,026,743 | 3/1962 | Curtis | 74—568 |
| 3,072,146 | 1/1963 | Gizeski | 91—167 X |
| 3,086,154 | 4/1963 | Lowther et al. | 318—162 |
| 3,131,379 | 4/1964 | Holt | 340—173 |
| 3,144,947 | 10/1964 | Pittwood. | |
| 3,144,948 | 10/1964 | Henig | 214—11 |

FOREIGN PATENTS
781,465 8/1955 Great Britain.

MARVIN A. CHAMPION, *Primary Examiner.*

MORRIS TEMIN, HUGO O. SCHULZ, *Examiners.*